(12) United States Patent
Wang et al.

(10) Patent No.: US 10,296,141 B2
(45) Date of Patent: May 21, 2019

(54) DEVICE, AND ADJUSTABLE PARAMETER ADJUSTMENT METHOD FOR DEVICE

(71) Applicant: Huawei Technologies Co., Ltd., Shenzhen (CN)

(72) Inventors: Chan Wang, Shenzhen (CN); Huangwei Wu, Shenzhen (CN); Yu Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/561,353

(22) PCT Filed: Mar. 31, 2015

(86) PCT No.: PCT/CN2015/075538
§ 371 (c)(1),
(2) Date: Sep. 25, 2017

(87) PCT Pub. No.: WO2016/154905
PCT Pub. Date: Oct. 6, 2016

(65) Prior Publication Data
US 2018/0081490 A1    Mar. 22, 2018

(51) Int. Cl.
*G06F 3/041*    (2006.01)
*G06K 9/00*    (2006.01)
(Continued)

(52) U.S. Cl.
CPC .......... *G06F 3/0418* (2013.01); *G06F 1/1692* (2013.01); *G06F 3/04883* (2013.01);
(Continued)

(58) Field of Classification Search
CPC .. G06F 2203/04105; G06F 3/017; G06F 3/02; G06F 3/041; G06F 3/0414;
(Continued)

(56) References Cited

U.S. PATENT DOCUMENTS

| 2008/0238878 | A1 | 10/2008 | Wang | |
|---|---|---|---|---|
| 2009/0058595 | A1* | 3/2009 | Mainguet | G06F 21/32 340/5.53 |
| 2015/0135108 | A1* | 5/2015 | Pope | G06K 9/00006 715/767 |

FOREIGN PATENT DOCUMENTS

| CN | 103365450 A | 10/2013 |
|---|---|---|
| CN | 103605474 A | 2/2014 |

(Continued)

OTHER PUBLICATIONS

Machine Translation and Abstract of Chinese Publication No. CN103365450, Oct. 23, 2013, 8 pages.
(Continued)

*Primary Examiner* — Md Saiful A Siddiqui
(74) *Attorney, Agent, or Firm* — Conley Rose, P.C.

(57) ABSTRACT

A device, and an adjustable parameter adjustment method for a device, where the device includes a touchscreen, and the touchscreen includes a touch sensor and a fingerprint sensor. A processor first adjusts a value of an adjustable parameter to a first value according to touch input of a user on the touch sensor, then receives accurate fingerprint input using the fingerprint sensor, and accurately adjusts the value of the adjustable parameter from the first value to a second value according to the fingerprint input in order to facilitate use for the user.

20 Claims, 10 Drawing Sheets

Receive touch input of a user on a touch sensor and adjust an adjustable parameter from an initial value to a first value using first adjustment precision in at least two types of adjustment precision with different precision values — S201

Receive fingerprint input of the user on a fingerprint sensor and adjust the first value to a second value using second adjustment precision in the at least two types of adjustment precision with different precision values — S202

(51) Int. Cl.
*G06F 1/16* (2006.01)
*G06F 3/0488* (2013.01)
*G06F 3/044* (2006.01)

(52) U.S. Cl.
CPC ............ *G06K 9/0002* (2013.01); *G06F 3/044* (2013.01); *G06F 2203/0338* (2013.01); *G06F 2203/04106* (2013.01)

(58) Field of Classification Search
CPC ...... G06F 3/0412; G06F 3/021; G06F 3/0418; G06F 3/04883
See application file for complete search history.

(56) References Cited

FOREIGN PATENT DOCUMENTS

| CN | 103914218 A | 7/2014 |
|---|---|---|
| CN | 104035721 A | 9/2014 |
| CN | 104182143 A | 12/2014 |
| WO | 2013173838 A2 | 11/2013 |

OTHER PUBLICATIONS

Machine Translation and Abstract of Chinese Publication No. CN103914218, Jul. 9, 2014, 15 pages.
Machine Translation and Abstract of Chinese Publication No. CN104035721, Sep. 10, 2014, 21 pages.
Machine Translation and Abstract of Chinese Publication No. CN104182143, Dec. 3, 2014, 15 pages.
Foreign Communication From a Counterpart Application, PCT Application No. PCT/CN2015/075538, English Translation of International Search Report dated Dec. 31, 2015, 2 pages.
Foreign Communication From a Counterpart Application, PCT Application No. PCT/CN2015/075538, English Translation of Written Opinion dated Dec. 31, 2015, 6 pages.
Foreign Communication From a Counterpart Application, European Application No. 15886891.9, Extended European Search Report dated Nov. 28, 2017, 7 pages.
Machine Translation and Abstract of Chinese Publication No. CN103605474, Feb. 26, 2014, 7 pages.
Foreign Communication From a Counterpart Application, Chinese Application No. 201580018778.8, Chinese Office Action dated Dec. 26, 2018, 9 pages.

\* cited by examiner

DEVICE, AND ADJUSTABLE PARAMETER ADJUSTMENT METHOD FOR DEVICE

CROSS-REFERENCE TO RELATED APPLICATIONS

This application is a U.S. National Stage of International Patent Application No. PCT/CN2015/075538 filed on Mar. 31, 2015, which is hereby incorporated by reference in its entirety.

TECHNICAL FIELD

Embodiments of the present disclosure relate to the field of computer technologies, and in particular, to a device, and an adjustable parameter adjustment method for a device.

BACKGROUND

With development of product manufacturing technologies, various devices are applied to user lives. For example, a user uses a portable device to listen to music or watch a video. To improve user experience, some device parameters can be adjusted by the user. Usually, adjustable parameters such as a device volume and a progress bar of a player installed on a device can be set by the user.

However, when adjusting adjustable device parameters, the user finds that most devices cannot accurately locate an adjustable parameter adjustment. For example, a device usually uses a capacitive touchscreen, and the capacitive touchscreen operates by means of human-body current induction. An operating principle of the capacitive touchscreen is as follows. A coupling capacitor forms between a user finger and a touchscreen surface because of a human-body electric field when the user finger touches the capacitive touchscreen. Because a high frequency signal is connected to the touchscreen, the finger absorbs a very small current. The current flows from each of electrodes on four corners of the touchscreen, and in theory, currents flowing from the four electrodes are proportional to distances between the finger and the four corners. The device obtains a location of a touch point of the user finger by calculating proportions of the four currents. As a result, information such as a moving distance of the user finger may also be learned of. However, capacitance changes with a contact area between the user finger and the touchscreen surface. In a possible case, when the user finger moves an extremely small distance to perform an extremely small adjustment on the adjustable parameter, a force application direction of the user finger also changes. A contact region between the user finger and the touchscreen before the movement basically matches a contact region between the user finger and the touchscreen after the movement. Therefore, the device considers that the user does not move the finger, and the device does not adjust the adjustable parameter. In another possible case, when the user adjusts the adjustable parameter to a value expected by the user, a shape of the touchscreen unevenly changes in a process in which the user finger moves away from the touchscreen. As a result, the device considers that the user is continuously moving the finger, and the device continuously adjusts the adjustable parameter. Consequently, in the other approaches, a device cannot accurately lock a location at which a user finger touches a touchscreen and cannot accurately adjust an adjustable parameter according to a user requirement.

SUMMARY

Embodiments of the present disclosure provide a device, and an adjustable parameter adjustment method for a device in order to accurately adjust an adjustable parameter.

According to a first aspect, an embodiment of the present disclosure provides an adjustable parameter adjustment method for a device, where the device includes a touchscreen, and the touchscreen includes a touch sensor configured to receive touch input of a user and a fingerprint sensor configured to receive fingerprint input of the user, where the adjustable parameter adjustment method for the device includes receiving the touch input of the user on the touch sensor and adjusting a value of an adjustable parameter to a first value according to the touch input, and receiving the fingerprint input of the user on the fingerprint sensor and adjusting the first value to a second value according to the fingerprint input.

With reference to the first aspect, in a first implementation manner, the device provides at least two types of adjustment precision with different precision values. Adjusting a value of an adjustable parameter to a first value includes adjusting the adjustable parameter from an initial value to the first value using first adjustment precision in the at least two types of adjustment precision with different precision values, and adjusting the first value to a second value includes adjusting the first value to the second value using second adjustment precision in the at least two types of adjustment precision with different precision values.

With reference to the first implementation manner of the first aspect, in a second implementation manner, the fingerprint input includes at least one or a combination of the following groups of information an extension direction of a fingerprint moving track and a length variation of the fingerprint moving track, a deviation direction of a fingerprint direction and a deviation angle variation of the fingerprint direction, or a pressure increment or sustained duration related to a fingerprint direction.

With reference to the second implementation manner of the first aspect, in a third implementation manner, adjusting the first value to the second value using second adjustment precision in the at least two types of adjustment precision with different precision values includes determining an adjustment type according to the extension direction of the moving track, where the adjustment type includes increase or decrease, determining an adjustment amount according to the length variation of the moving track and a step corresponding to the second adjustment precision, and adjusting the first value to the second value with reference to the adjustment type and the adjustment amount.

With reference to the second implementation manner of the first aspect, in a fourth implementation manner, adjusting the first value to the second value using second adjustment precision in the at least two types of adjustment precision with different precision values includes determining an adjustment type according to the deviation direction of the fingerprint direction, where the adjustment type includes increase or decrease, determining an adjustment amount according to the deviation angle variation of the fingerprint direction and a step corresponding to the second adjustment precision, and adjusting the first value to the second value with reference to the adjustment type and the adjustment amount.

With reference to the second implementation manner of the first aspect, in a fifth implementation manner, adjusting the first value to the second value using second adjustment precision in the at least two types of adjustment precision with different precision values includes determining an adjustment type according to the fingerprint direction, where the adjustment type includes increase or decrease, determining an adjustment amount according to the pressure increment or sustained duration related to the fingerprint direction, and a step corresponding to the second adjustment precision, and adjusting the first value to the second value with reference to the adjustment type and the adjustment amount.

With reference to any one of the first aspect to the fifth implementation manner of the first aspect, in a sixth implementation manner, before adjusting the first value to a second value according to the fingerprint input, the method further includes receiving trigger information used to trigger the device to perform adjusting the first value to a second value according to the fingerprint input.

With reference to the sixth implementation manner of the first aspect, in a seventh implementation manner, the trigger information includes at least one piece of the following information a designated signal triggered by a physical button of the device, information indicating that the user performs a designated touch operation, information indicating that a designated touch operation is performed for preset times, information indicating that a designated touch operation lasts for preset duration, or information indicating that an execution speed of a designated touch operation falls within a preset range.

With reference to the seventh implementation manner of the first aspect, in an eighth implementation manner, the designated touch operation is recognized according to the fingerprint input obtained before the trigger information is received.

With reference to the seventh or the eighth implementation manner of the first aspect, in a ninth implementation manner, the designated touch operation includes at least one or a combination of the operations of tapping, pressing, sliding, rotation, or jiggling.

According to a second aspect, an embodiment of the present disclosure provides a device, including a touchscreen, where the touchscreen includes a touch sensor configured to receive touch input of a user and a fingerprint sensor configured to receive fingerprint input of the user, a touch adjustment module configured to receive the touch input of the user on the touch sensor and adjust a value of an adjustable parameter to a first value according to the touch input, and a fingerprint adjustment module configured to receive the fingerprint input of the user on the fingerprint sensor and adjust the first value to a second value according to the fingerprint input.

With reference to the second aspect, in a first implementation manner, the device provides at least two types of adjustment precision with different precision values. The touch adjustment module includes a touch adjustment unit configured to adjust the adjustable parameter from an initial value to the first value using first adjustment precision in the at least two types of adjustment precision with different precision values, and the fingerprint adjustment module includes a fingerprint adjustment unit configured to adjust the first value to the second value using second adjustment precision in the at least two types of adjustment precision with different precision values.

With reference to the first implementation manner of the second aspect, in a second implementation manner, the fingerprint input includes at least one or a combination of the following groups of information an extension direction of a fingerprint moving track and a length variation of the fingerprint moving track, a deviation direction of a fingerprint direction and a deviation angle variation of the fingerprint direction, or a pressure increment or sustained duration related to a fingerprint direction.

With reference to the second implementation manner of the second aspect, in a third implementation manner, the fingerprint adjustment unit is further configured to determine an adjustment type according to the extension direction of the moving track, where the adjustment type includes increase or decrease, determine an adjustment amount according to the length variation of the moving track and a step corresponding to the second adjustment precision, and adjust the first value to the second value with reference to the adjustment type and the adjustment amount.

With reference to the second implementation manner of the second aspect, in a fourth implementation manner, the fingerprint adjustment unit is further configured to determine an adjustment type according to the deviation direction of the fingerprint direction, where the adjustment type includes increase or decrease, determine an adjustment amount according to the deviation angle variation of the fingerprint direction and a step corresponding to the second adjustment precision, and adjust the first value to the second value with reference to the adjustment type and the adjustment amount.

With reference to the second implementation manner of the second aspect, in a fifth implementation manner, the fingerprint adjustment unit is further configured to determine an adjustment type according to the fingerprint direction, where the adjustment type includes increase or decrease, determine an adjustment amount according to the pressure increment or sustained duration related to the fingerprint direction, and a step corresponding to the second adjustment precision, and adjust the first value to the second value with reference to the adjustment type and the adjustment amount.

With reference to any one of the second aspect to the fifth implementation manner of the second aspect, in a sixth implementation manner, the fingerprint adjustment module is further configured to receive trigger information used to trigger the device to perform adjusting the first value to a second value according to the fingerprint input.

With reference to the sixth implementation manner of the second aspect, in a seventh implementation manner, the trigger information includes at least one piece of information of a designated signal triggered by a physical button of the device, information indicating that the user performs a designated touch operation, information indicating that a designated touch operation is performed for preset times, information indicating that a designated touch operation lasts for preset duration, or information indicating that an execution speed of a designated touch operation falls within a preset range.

With reference to the seventh implementation manner of the second aspect, in an eighth implementation manner, the fingerprint adjustment module is further configured to recognize the designated touch operation according to the fingerprint input obtained before the trigger information is received.

With reference to the seventh or the eighth implementation manner of the second aspect, in a ninth implementation manner, the designated touch operation includes at least one or a combination of the operations of tapping, pressing, sliding, rotation, or jiggling.

According to a third aspect, an embodiment of the present disclosure provides a device, including a touchscreen, where the touchscreen includes a touch sensor configured to receive touch input of a user and a fingerprint sensor configured to receive fingerprint input of the user, and a processor configured to receive the touch input of the user on the touch sensor and adjust a value of an adjustable parameter to a first value according to the touch input, and receive the fingerprint input of the user on the fingerprint sensor and adjust the first value to a second value according to the fingerprint input.

With reference to the third aspect, in a first implementation manner, the device provides at least two types of adjustment precision with different precision values, and when adjusting the value of the adjustable parameter to the first value according to the touch input, the processor is further configured to adjust the adjustable parameter from an initial value to the first value using first adjustment precision in the at least two types of adjustment precision with different precision values, and when adjusting the first value to the second value according to the fingerprint input, the processor is further configured to adjust the first value to the second value using second adjustment precision in the at least two types of adjustment precision with different precision values.

With reference to the first implementation manner of the third aspect, in a second implementation manner, the fingerprint input includes at least one or a combination of the following groups of information an extension direction of a fingerprint moving track and a length variation of the fingerprint moving track, a deviation direction of a fingerprint direction and a deviation angle variation of the fingerprint direction, or a pressure increment or sustained duration related to a fingerprint direction.

With reference to the second implementation manner of the third aspect, in a third implementation manner, when adjusting the first value to the second value using the second adjustment precision in the at least two types of adjustment precision with different precision values, the processor is further configured to determine an adjustment type according to the extension direction of the moving track, where the adjustment type includes increase or decrease, determine an adjustment amount according to the length variation of the moving track and a step corresponding to the second adjustment precision, and adjust the first value to the second value with reference to the adjustment type and the adjustment amount.

With reference to the second implementation manner of the third aspect, in a fourth implementation manner, when adjusting the first value to the second value using the second adjustment precision in the at least two types of adjustment precision with different precision values, the processor is further configured to determine an adjustment type according to the deviation direction of the fingerprint direction, where the adjustment type includes increase or decrease, determine an adjustment amount according to the deviation angle variation of the fingerprint direction and a step corresponding to the second adjustment precision, and adjust the first value to the second value with reference to the adjustment type and the adjustment amount.

With reference to the second implementation manner of the third aspect, in a fifth implementation manner, when adjusting the first value to the second value using the second adjustment precision in the at least two types of adjustment precision with different precision values, the processor is further configured to determine an adjustment type according to the fingerprint direction, where the adjustment type includes increase or decrease, determine an adjustment amount according to the pressure increment or sustained duration related to the fingerprint direction, and a step corresponding to the second adjustment precision, and adjust the first value to the second value with reference to the adjustment type and the adjustment amount.

With reference to any one of the third aspect to the fifth implementation manner of the third aspect, in a sixth implementation manner, the processor is further configured to receive trigger information used to trigger the device to perform adjusting the first value to a second value according to the fingerprint input.

With reference to the sixth implementation manner of the third aspect, in a seventh implementation manner, the trigger information includes at least one piece of the following information a designated signal triggered by a physical button of the device, information indicating that the user performs a designated touch operation, information indicating that a designated touch operation is performed for preset times, information indicating that a designated touch operation lasts for preset duration, or information indicating that an execution speed of a designated touch operation falls within a preset range.

With reference to the seventh implementation manner of the third aspect, in an eighth implementation manner, the processor is further configured to recognize the designated touch operation according to the fingerprint input obtained before the trigger information is received.

With reference to the seventh or the eighth implementation manner of the third aspect, in a ninth implementation manner, the designated touch operation includes at least one or a combination of the operations of tapping, pressing, sliding, rotation, or jiggling.

According to the device, and the adjustable parameter adjustment method for a device that are provided in the embodiments of the present disclosure, when an adjustable parameter of the device is adjusted, a value of the adjustable parameter is first adjusted to a first value according to touch input of a user on a touch sensor, then accurate fingerprint input may be received using a fingerprint sensor, and the value of the adjustable parameter is accurately adjusted from the first value to a second value according to the fingerprint input. That is, the adjustable parameter is adjusted to a value expected by the user in order to facilitate use for the user.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
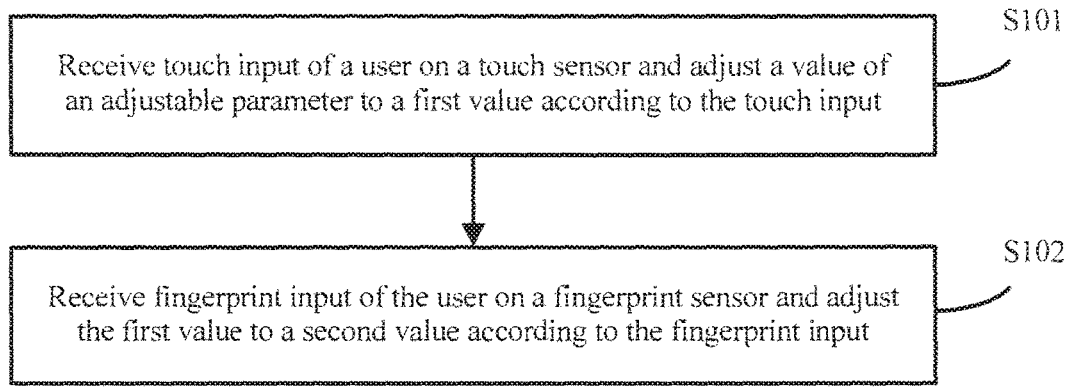
FIG. 1 is a schematic flowchart of Embodiment 1 of an adjustable parameter adjustment method for a device according to the present disclosure.

FIG. 1 is a schematic flowchart of Embodiment 1 of an adjustable parameter adjustment method for a device according to the present disclosure. As shown in FIG. 1, the device in this embodiment may be a device with a fingerprint recognition function such as a mobile terminal or an iPad. The device includes a touchscreen, and the touchscreen includes a touch sensor configured to receive touch input of a user and a fingerprint sensor configured to receive fingerprint input of the user. Further, when a user finger touches the touchscreen, the touch sensor included in the touchscreen can collect touch input, and the fingerprint sensor included in the touchscreen can collect fingerprint input. The device in this embodiment can adjust an adjustable parameter of the device according to a recognized fingerprint, and a specific process is as follows.

Step S101: Receive touch input of a user on the touch sensor and adjust a value of an adjustable parameter to a first value according to the touch input.

When the user needs to adjust the adjustable parameter, the user performs a touch operation for adjusting the adjustable parameter on the touchscreen, for example, sliding or dragging. In step S101, when the user performs the touch operation for adjusting the adjustable parameter, the touch sensor senses that the user performs the touch operation for adjusting the adjustable parameter, that is, the device receives the touch input of the user on the touch sensor. The touch input may be considered as information that is generated when the user performs the touch operation for adjusting the adjustable parameter and that is obtained by the touch sensor, for example, an electrical signal. Then the value of the adjustable parameter may be adjusted to the first value according to the touch input.

Because the touch sensor cannot accurately recognize touch input generated when the user finger moves an extremely small distance, or receives incorrect touch input when the user finger shakes or applies a force at a deviated point, a probability that the user adjusts the value of the adjustable parameter to a value expected by the user at a time is usually relatively small when the touch operation for adjusting the adjustable parameter is performed. Therefore, the device adjusts, by performing step S101, the value of the adjustable parameter to the first value close to the value expected by the user, and then continues to adjust, by performing step S102, the first value to the value expected by the user.

Step S102: Receive fingerprint input of the user on the fingerprint sensor and adjust the first value to a second value according to the fingerprint input.

It may be understood that the touch operation for adjusting the adjustable parameter is performed again after the adjustable parameter is adjusted to the first value close to the second value such that the value of the adjustable parameter can be adjusted to the value expected by the user, that is, the second value. In this case, the fingerprint sensor obtains the fingerprint input of the user, and then the first value is adjusted to the second value according to the fingerprint input.

Figure 2A:
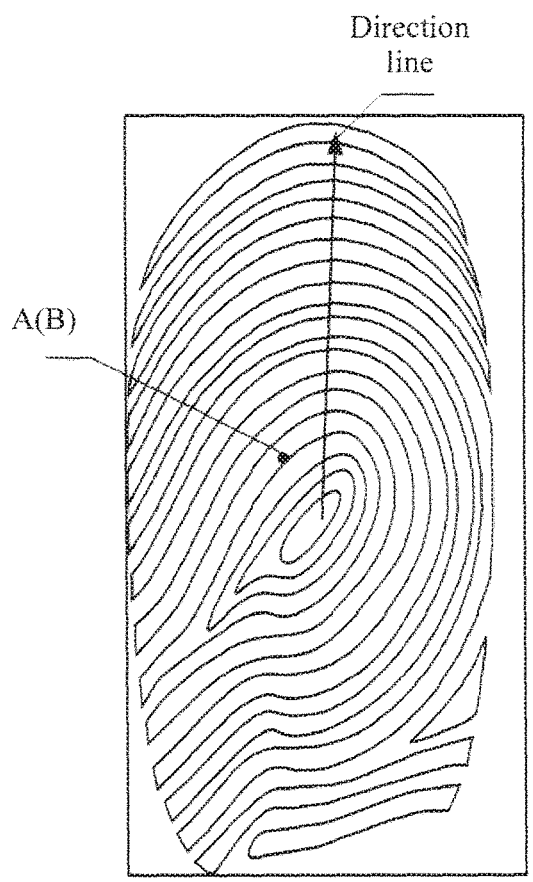
FIG. 2A is a schematic diagram of a fingerprint image in Embodiment 1 of an adjustable parameter adjustment method for a device according to the present disclosure.
Figure 2B:
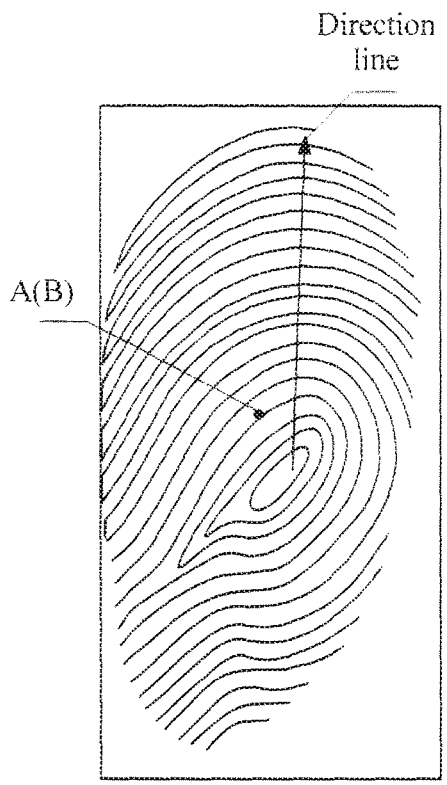
FIG. 2B is a schematic diagram of another fingerprint image in Embodiment 1 of an adjustable parameter adjustment method for a device according to the present disclosure.

Further, when the user performs the touch operation for adjusting the adjustable parameter, the finger comes into contact with the touchscreen, and therefore, the fingerprint sensor can detect a fingerprint image of the user in real time, that is, can receive the fingerprint input of the user in real time. It may be understood that, though the user finger does not move, an area of a captured fingerprint image varies with a force of pressing a fingerprint recognition region by the user. However, because the user fingerprint does not change, at least one same node (for example, a central point, a bifurcation point, or an endpoint) in two fingerprint images of different areas fits the touchscreen at a same location as long as the user finger does not move. FIG. 2A is a schematic diagram of a fingerprint image in Embodiment 1 of an adjustable parameter adjustment method for a device according to the present disclosure. FIG. 2B is a schematic diagram of another fingerprint image in Embodiment 1 of an adjustable parameter adjustment method for a device according to the present disclosure. As shown in FIG. 2A and FIG. 2B, the user expects to tap a point A in the fingerprint recognition region, and the user finger does not move after the user taps the point A. Although a contact region between the user finger and the touchscreen changes because of a change in force application or a change in a force application point, fingerprint lines that fit the point A in FIG. 2A and FIG. 2B are completely consistent, and the point A is the same as a point B that fits the point A on the fingerprint lines, or fingerprint direction lines (fingerprint direction for short in the following) determined according to ridge lines in fingerprint images are consistent. In addition, when the user finger moves an extremely small distance, the fingerprint sensor may learn in a timely manner of the movement of the user finger and the extremely small distance of the movement accurately using the foregoing nodes or deviation of a fingerprint direction. Therefore, in this embodiment, after the adjustable parameter is adjusted to the first value, a moving distance, a rotation angle, and the like of the user finger may be accurately learned of using the fingerprint input of the user that is received by the fingerprint sensor such that the value of the adjustable parameter can be accurately adjusted to the second value expected by the user. However, in the other approaches, the device usually obtains the touch input of the user using the touch sensor, and it may be inferred that a contact region between the user finger and the touchscreen slightly changes when the value of the adjustable parameter is adjusted to the second value according to the touch input. For example, while seeing that the value of the adjustable parameter is the second value, the user terminates the adjustment, and a contact region between the user finger and the touchscreen slightly changes in a process in which the finger moves away from the touchscreen. Therefore, a shape of the touchscreen unevenly changes, the touch sensor obtains new touch input, and the device considers that the user is continuously moving the finger and the device continues to adjust the value of the adjustable parameter to another value. As a result, a final adjustment result of the adjustable parameter differs from the value expected by the user, and use for the user is affected. Alternatively, when the user finger moves an extremely small distance to perform an extremely small adjustment on the adjustable parameter, a contact region between the user finger and the touchscreen before the movement may overlap a contact region between the user finger and the touchscreen after the movement because the user finger moves only the extremely small distance and a force application direction of the user finger deviates. As a result, the device determines that the user finger does not move, and the device cannot implement the extremely small adjustment on the adjustable parameter. Therefore, in this embodiment, when the value of the adjustable parameter is adjusted to the second value expected by the user, the adjustable parameter may be accurately adjusted, using the fingerprint sensor, to the value expected by the user.

It should be additionally noted that, the touch operation for adjusting the adjustable parameter that is performed by the user in step S101 and the touch operation for adjusting the adjustable parameter that is performed by the user in step S102 may be the same or may be different. For ease of differentiation, the touch operation for adjusting the adjustable parameter that is performed by the user in step S101 may be considered as a first touch operation, and the touch operation for adjusting the adjustable parameter that is performed by the user in step S102 may be considered as a second touch operation. Further, when the first touch operation is the same as the second touch operation, for example, both are sliding operations, optionally, the first touch operation and the second touch operation may be two discontinuous touch operations. For example, the first touch operation may be a sliding operation performed for the first time, and the second touch operation is a sliding operation performed for the second time. Alternatively, the first touch operation and the second touch operation may be a continuous touch operation. For example, the user finger completes a sliding operation, but a sliding speed of the user finger gradually decreases from the beginning of the sliding to the end of the sliding. Therefore, a sliding process in which a sliding speed is not lower than a preset speed may be considered as the first touch operation, and a sliding process in which a sliding speed is lower than the preset speed is considered as the second touch operation.

In this embodiment, when an adjustable parameter of a device is adjusted, a value of the adjustable parameter is first adjusted to a first value according to touch input of a user on a touch sensor, then accurate fingerprint input may be received using a fingerprint sensor, and the value of the adjustable parameter is accurately adjusted from the first value to a second value according to the fingerprint input. That is, the adjustable parameter is adjusted to a value expected by the user in order to facilitate use for the user.

Figure 3:
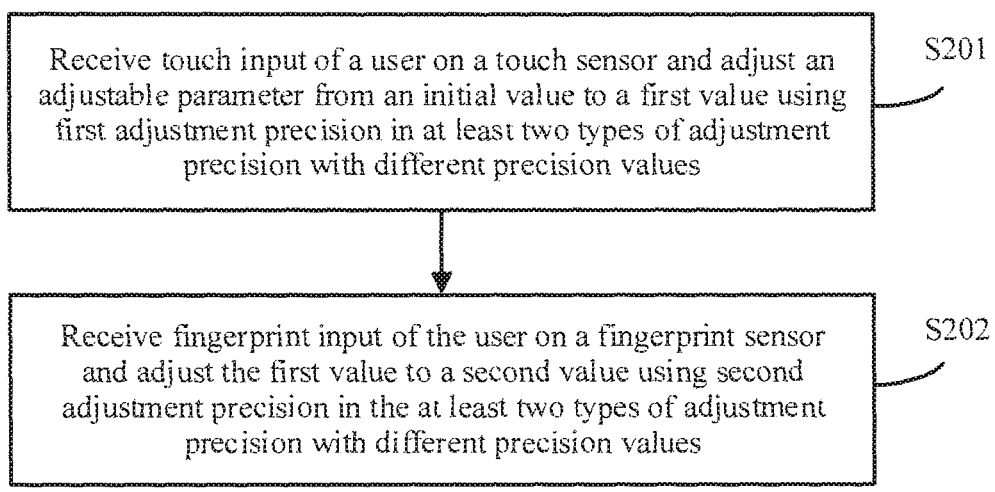
FIG. 3 is a schematic flowchart of Embodiment 2 of an adjustable parameter adjustment method for a device according to the present disclosure.

FIG. 3 is a schematic flowchart of Embodiment 2 of an adjustable parameter adjustment method for a device according to the present disclosure. As shown in FIG. 3, this embodiment provides a further description based on the embodiment shown in FIG. 1. Further, the device provides at least two types of adjustment precision with different precision values, and this embodiment includes the following steps.

Step S201: Receive the touch input of the user on the touch sensor and adjust the adjustable parameter from an initial value to the first value using first adjustment precision in the at least two types of adjustment precision with different precision values.

Step S202: Receive the fingerprint input of the user on the fingerprint sensor and adjust the first value to the second value using second adjustment precision in the at least two types of adjustment precision with different precision values.

The touch sensor cannot accurately recognize the touch input generated when the user finger moves an extremely small distance, or receives incorrect touch input when the user finger shakes or applies a force at a deviated point. However, the fingerprint input obtained by the fingerprint sensor can accurately indicate whether the user finger moves, and the extremely small movement of the user finger can be accurately recognized, or the fingerprint sensor does not consider that the user finger moves or therefore continue to adjust the adjustable parameter because the user finger shakes or applies a force at a deviated point. Therefore, in this embodiment, to make full use of the fingerprint sensor and activate a feature of the touch sensor, when the adjustable parameter is adjusted according to the touch input, the adjustable parameter is adjusted from the initial value to the first value using the first adjustment precision in the at least two types of adjustment precision with different precision values. Then, when the adjustable parameter is adjusted according to the fingerprint input, the first value is adjusted to the second value using the second adjustment precision in the at least two types of adjustment precision with different precision values.

A precision value of the first adjustment precision is usually less than a precision value of the second adjustment precision. When the adjustable parameter is adjusted according to the touch input, the device can rapidly adjust the adjustable parameter to the first value using the first adjustment precision. Then, according to the fingerprint input, the device can accurately adjust the adjustable parameter from the first value to the second value using the second adjustment precision.

In this embodiment, a device provides multiple types of adjustment precision. When an adjustable parameter is adjusted, after touch input is obtained using a touch sensor, the device rapidly adjusts the adjustable parameter to a first value using first adjustment precision, then obtains accurate fingerprint input using a fingerprint sensor, and accurately adjusts the adjustable parameter from the first value to a second value using second adjustment precision. Because a fingerprint includes multiple features such as nodes and fingerprint directions, an extremely small movement of a user finger can be detected in order to avoid that the device does not accurately locate the user finger or cannot obtain an extremely small change in location of the user finger. Therefore, the device can adjust, using the fingerprint input and the second adjustment precision and according to a user requirement, the adjustable parameter to a value expected by a user in order to facilitate use for the user.

Figure 4:
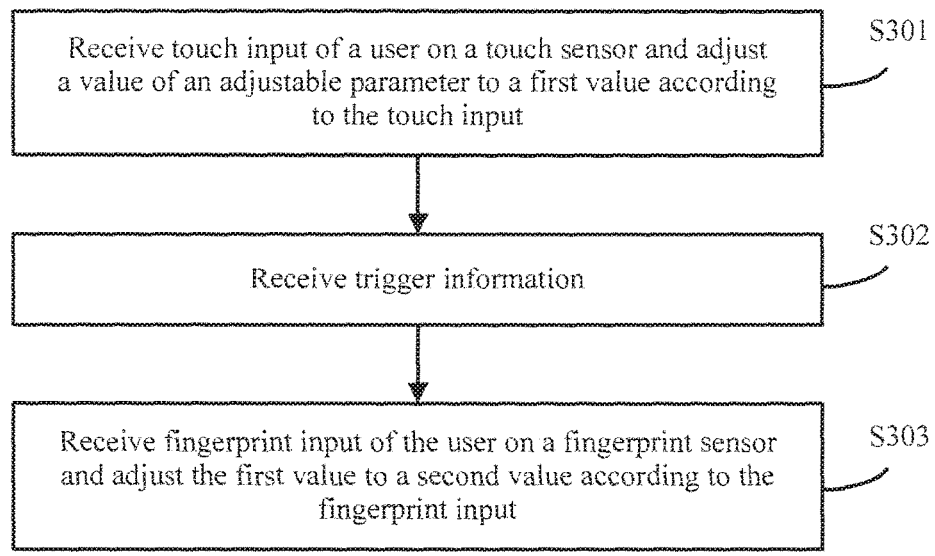
FIG. 4 is a schematic flowchart of Embodiment 3 of an adjustable parameter adjustment method for a device according to the present disclosure.

FIG. 4 is a schematic flowchart of Embodiment 3 of an adjustable parameter adjustment method for a device according to the present disclosure. As shown in FIG. 4, this embodiment provides a further description based on the embodiment shown in FIG. 1 or FIG. 3, and includes the following steps.

Step S301: Receive the touch input of the user on the touch sensor and adjust the value of the adjustable parameter to the first value according to the touch input.

Optionally, in this embodiment, during implementation of step S301, the user performs a first touch operation. The touch sensor runs and enables the device to receive the touch input of the user on the touch sensor such that the adjustable parameter is adjusted from the initial value to the first value using the first adjustment precision in the at least two types of adjustment precision with different precision values.

Step S302: Receive trigger information.

In this embodiment, the trigger information is used to trigger the device to perform the step of adjusting the first value to a second value according to the fingerprint input. It may be understood that the fingerprint input needs to be received by the fingerprint sensor, and therefore the trigger information may be considered to be used to trigger the fingerprint sensor. Alternatively, the fingerprint sensor always runs, that is, while the touch sensor senses the touch input, the fingerprint sensor detects a fingerprint to enable the device to receive the fingerprint input of the user on the fingerprint sensor. However, in this case, the device only needs to rapidly adjust the adjustable parameter to the first value without using the fingerprint input that is received before the trigger information is received. When the adjustable parameter needs to be precisely adjusted to the second value according to the fingerprint input, the trigger information enables the device to learn that the adjustable parameter needs to be adjusted according to the fingerprint input, and the fingerprint input of the user on the fingerprint sensor that is received by the device is used while or after the trigger information is received. Hence, the fingerprint input of the user on the fingerprint sensor that is received by the device takes effect while or after the trigger information is received. The fingerprint input is used to adjust the adjustable parameter.

Optionally, the trigger information includes at least one piece of the following information a designated signal triggered by a physical button of the device, information indicating that the user performs a designated touch operation, information indicating that a designated touch operation is performed for preset times, information indicating that a designated touch operation lasts for preset duration, or information indicating that a designated touch operation is performed at a preset speed. When the trigger information is the designated signal triggered by the physical button of the device, there may be one or more physical buttons. For example, a signal generated by pressing a power button and a volume button of the device at the same time is previously set as the trigger signal in the device. In addition, a touch operation of the user on the touchscreen of the device generally enables the touch sensor to generate a corresponding electrical signal that may indicate touch coordinates, and the device recognizes, according to the electrical signal, the touch operation performed by the user. Alternatively, when the user performs a touch operation on the touchscreen of the device, a user finger touches the touchscreen, and the device detects a user fingerprint using the fingerprint sensor and recognizes the touch operation of the user according to a fingerprint direction or a fingerprint moving track. Therefore, the touch operation recognized by the device may be considered as information received by the device. Hence, when the device recognizes that the user performs the designated touch operation, it may also be considered as the trigger information received by the device. When the designated touch operation is performed for preset times, or the designated touch operation lasts for preset duration, or the designated touch operation is performed at the preset speed, or the like, it may also serve as the trigger information. Optionally, the designated touch operation includes at least one or a combination of the operations of tapping, pressing, sliding, rotation, or jiggling.

Optionally, the designated touch operation is recognized according to the fingerprint input that is obtained before the trigger information is received.

Step S303: Receive fingerprint input of the user on the fingerprint sensor and adjust the first value to the second value according to the fingerprint input.

Optionally, when step S303 is performed, if the first value is adjusted to the second value using second adjustment precision in the at least two types of adjustment precision that take different precision values and that are provided by the device, the trigger information may also be considered to be used to switch the adjustment precision of the device.

Further, it is assumed that the first adjustment precision is low adjustment precision. Each time the user finger slides a unit distance, an adjustment range of the adjustable parameter using the low adjustment precision is 5. Each time the user finger slides a unit distance, an adjustment range of the adjustable parameter using high adjustment precision is 0.5. After receiving the trigger information, the device receives the fingerprint input using the fingerprint sensor and can complete a high-precision adjustment of the adjustable parameter according to the fingerprint input.

The fingerprint input includes at least one or a combination of the following groups of information an extension direction of a fingerprint moving track and a length variation of the fingerprint moving track, a deviation direction of a fingerprint direction and a deviation angle variation of the fingerprint direction, or a pressure increment or sustained duration related to a fingerprint direction.

Figure 5A:
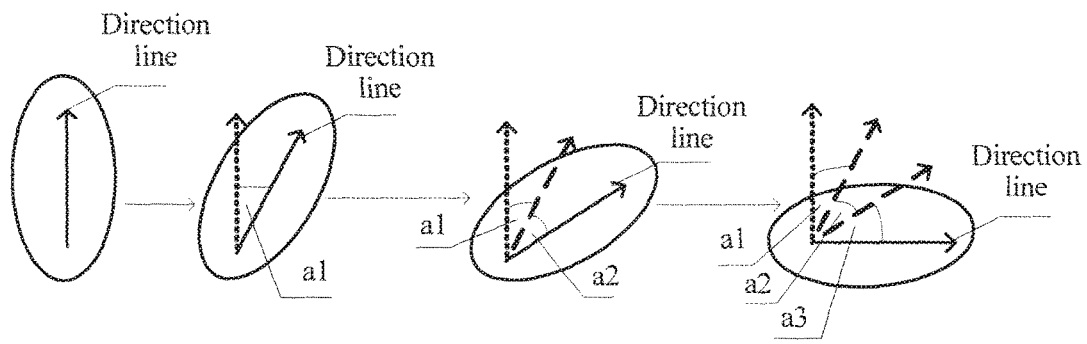
FIG. 5A is a schematic diagram of finger jiggling in Embodiment 3 of an adjustable parameter adjustment method for a device according to the present disclosure.
Figure 5B:
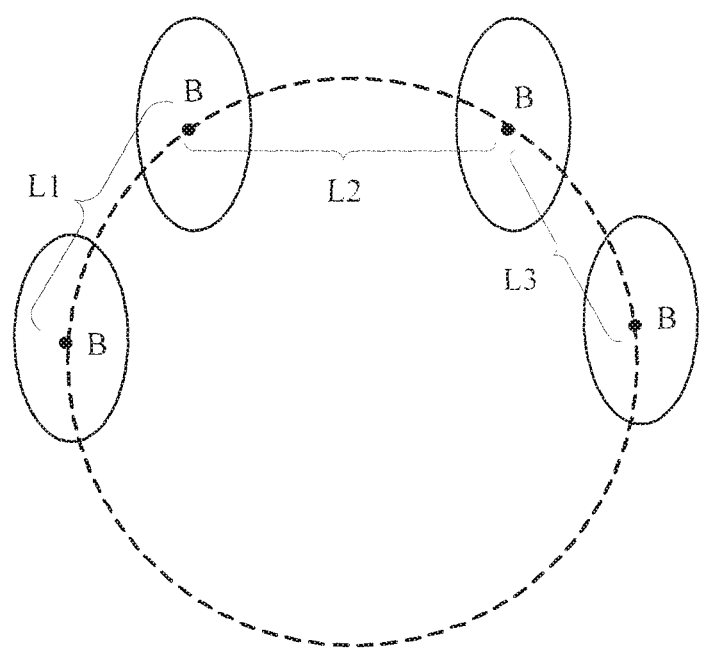
FIG. 5B is a schematic diagram of finger rotation in Embodiment 3 of an adjustable parameter adjustment method for a device according to the present disclosure.

Further, when the user performs a second touch operation on the touchscreen, the user finger certainly comes into contact with the touchscreen. The fingerprint sensor can detect the user fingerprint, and may detect only one of the fingerprint direction, the fingerprint moving track, or the like, or may detect all the fingerprint direction, the fingerprint moving track, and the like. FIG. 5A is a schematic diagram of finger jiggling in Embodiment 3 of an adjustable parameter adjustment method for a device according to the present disclosure. FIG. 5B is a schematic diagram of finger rotation in Embodiment 3 of an adjustable parameter adjustment method for a device according to the present disclosure. If the second touch operation is jiggling a finger, that is, the user controls, in a manner of jiggling the finger, the adjustable parameter to increase or decrease, the deviation direction of the fingerprint direction and the deviation angle variation of the fingerprint direction may be determined by detecting the fingerprint. For example, in FIG. 5A, the deviation direction of the fingerprint direction is a clockwise direction, and deviation angles a1, a2, and a3 are generated in sequence with the deviation of the fingerprint direction. If the fingerprint moving track is also detected in addition to detection of the fingerprint direction, it may be learned from FIG. 5A that the fingerprint moving track is a point, the fingerprint moving track has no extension direction, and a length variation of the moving track is not generated (alternatively, there is an extremely small negligible variation). Therefore, that the user performs the jiggling operation may be recognized. Similarly, if the second touch operation is rotating a finger, that is, the user controls, in a manner of rotating the finger, the adjustable parameter to increase or decrease, the extension direction of the fingerprint moving track and the length variation of the fingerprint moving track are detected. As shown in FIG. 5B, if a node B of a fingerprint is used as a feature point for recognizing the fingerprint, it is determined, by detecting the point B on the fingerprint, that the extension direction of the fingerprint moving track is a clockwise direction, and length variations L1, L2, and L3 of the moving track are generated in sequence with the rotation of the user finger.

In addition, alternatively, the user may further enable, by pressing the touchscreen, the device to adjust the adjustable parameter according to a pressing force or pressing duration. For example, by detecting the fingerprint, if it is learned that the fingerprint moving track does not extend, the length of the moving track does not change and the fingerprint direction does not deviate, it may be determined that the second touch operation performed by the user is pressing. In this case, a pressure variation or the sustained duration related to the fingerprint direction is used as change information corresponding to the fingerprint.

It should be noted that the second touch operation, that is, the touch operation for adjusting the adjustable parameter, is planned by the device (i.e., a manufacturer of the device, or a developer of an application on the device). The user performs, according to an instruction of the device (i.e., the manufacturer of the device, or the developer of the application on the device), the touch operation for adjusting the adjustable parameter. It may be understood that different touch operations for adjusting adjustable parameter may be planned by different devices or different developers of applications on the device. Different touch operations for adjusting the adjustable parameter correspond to different touch operations of adjusting adjustable parameters to be performed by the user, and further correspond to different information included in change information corresponding to a received fingerprint when the user performs the touch operations for adjusting the adjustable parameter. For example, if a touch operation for adjusting an adjustable parameter that is indicated by an application is jiggling, change information corresponding to a fingerprint received by the device when the user slides a finger is a deviation direction of a fingerprint direction and a deviation angle variation of the fingerprint direction. If a touch operation for adjusting an adjustable parameter that is indicated by another application is rotation, change information corresponding to a fingerprint received by the device when the user rotates a finger is an extension direction of a fingerprint moving track and a length variation of the fingerprint moving track.

Different touch operations for adjusting adjustable parameter that are indicated by the devices (or manufacturers of the devices, or developers of applications on the devices) correspond to different information included in the fingerprint input. There may be multiple specific implementation processes of step S303, and the following three implementation processes are merely examples in this embodiment.

A1: An adjustment type is determined according to the extension direction of the moving track, and the adjustment type includes increase or decrease.

When a user performs a second touch operation that generates a fingerprint moving track, such as sliding or rotation, the device can obtain an extension direction of the fingerprint moving track and a length variation of the fingerprint moving track by detecting a fingerprint, and can learn, according to the extension direction of the moving track, whether the user expects to increase or decrease the adjustable parameter. For example, when the moving track extends clockwise, the adjustment type may be determined as increase, and when the moving track extends counterclockwise, the adjustment type may be determined as decrease. Alternatively, when the moving track extends towards the upper edge of the touchscreen of the device (that is, a moving track generated when the user slides a finger upwards on the touchscreen), the adjustment type may be determined as increase, and when the moving track extends towards the lower edge of the touchscreen of the device (that is, a moving track generated when the user slides a finger downwards on the touchscreen), the adjustment type may be determined as decrease.

A2: An adjustment amount is determined according to the length variation of the moving track and a step corresponding to the second adjustment precision.

It may be understood that different types of adjustment precision that are set by the device correspond to different steps. For example, when a type of adjustment precision is used, each time the moving track increases by a unit length, the adjustable parameter is adjusted (increased or decreased) by 1, that is, a step is 1. When another type of adjustment precision is used, each time the moving track increases by a unit length, the adjustable parameter is adjusted (increased or decreased) by 0.1, that is, a step is 0.1. Therefore, in this embodiment, the adjustment amount is determined according to the length variation of the moving track and the step corresponding to the second adjustment precision.

In addition, different unit lengths are probably recognized using different types of adjustment precision, and therefore, precision for determining the length variation of the moving track also varies. For example, when low adjustment precision is used, a recognized unit length is 1, and a corresponding adjustment step is 1. In this case, if the user slides the finger to increase the moving track of the fingerprint by 0.5, and expects to increase the adjustable parameter by 0.5, because the device cannot precisely recognize 0.5, even though the length of the moving track of the fingerprint actually increases by 0.5, the length variation of the moving track that is determined by the device is 0 or 1 (that is, a processing result of 0.5 is 0 or 1). Correspondingly, the adjustable parameter is not increased (a processing result of 0.5 is 0) or the adjustable parameter is directly increased by 1 (a processing result of 0.5 is 1). Therefore, an adjustment expected by the user for the adjustable parameter cannot be implemented. However, if the user triggers, by inputting trigger information, relatively high adjustment precision, that is, the second adjustment precision, a unit length that can be recognized by the device using the second adjustment precision is 0.1, and a corresponding step is 0.1. When the user slides the finger to actually increase the moving track of the fingerprint by 0.5, the device correspondingly increases the adjustable parameter by 0.5.

A3: The first value is adjusted to the second value with reference to the adjustment type and the adjustment amount.

Flexibly, B1 to B3 may be performed to replace A1 to A3.

B1: An adjustment type is determined according to the deviation direction of the fingerprint direction, and the adjustment type includes increase or decrease.

When the user adjusts the adjustable parameter by performing a touch operation that generates a change in a fingerprint direction, such as jiggling, a deviation direction and a deviation angle variation of the fingerprint direction may be obtained by detecting a fingerprint, and whether the user expects to increase or decrease the adjustable parameter may be learned according to the deviation direction of the fingerprint direction. For example, when the fingerprint direction deviates clockwise, the adjustment type may be determined as increase, and when the fingerprint direction deviates counterclockwise, the adjustment type may be determined as decrease.

B2: An adjustment amount is determined according to the deviation angle variation of the fingerprint direction and a step corresponding to the second adjustment precision.

Similar to A2, for example, when a type of adjustment precision is used, each time the fingerprint direction deviates by a unit angle, the adjustable parameter is adjusted by 1, that is, a step is 1. When another type of adjustment precision is used, each time the fingerprint direction deviates by a unit angle, the adjustable parameter is adjusted by 0.5, that is, a step is 0.5. Therefore, in this embodiment, the adjustment amount is determined according to the deviation angle variation of the fingerprint direction and the step corresponding to the second adjustment precision.

In addition, different unit angles are probably recognized using different types of adjustment precision, and therefore, precision for determining the angle variation also varies. For example, when low adjustment precision is used, a recognized unit angle is 1, and a corresponding adjustment step is 1. In this case, if the user jiggles the finger to increase the deviation angle of the fingerprint direction by 0.5, and expects to increase the adjustable parameter by 0.5, because the device cannot precisely recognize 0.5, even though the deviation angle of the fingerprint direction actually increases by 0.5, an angle increment determined by the device is 0 or 1 (that is, a processing result of 0.5 is 0 or 1). Correspondingly, the adjustable parameter is not increased (a processing result of 0.5 is 0) or the adjustable parameter is directly increased by 1 (a processing result of 0.5 is 1). Therefore, an adjustment expected by the user for the adjustable parameter cannot be implemented. However, if the user triggers, by inputting trigger information, relatively high adjustment precision, that is, the second adjustment precision, a unit angle that can be recognized by the device using the second adjustment precision is 0.1, and a corresponding step is 0.1. When the user jiggles the finger to increase the deviation angle of the fingerprint direction by 0.5, the device correspondingly increases the adjustable parameter by 0.5.

B3: The first value is adjusted to the second value with reference to the adjustment type and the adjustment amount.

Flexibly, C1 to C3 may be performed to replace A1 to A3 or B1 to B3.

C1: An adjustment type is determined according to the fingerprint direction, and the adjustment type includes increase or decrease.

When the user adjusts the adjustable parameter by performing a touch operation in which a fingerprint direction does not change in a time period, such as pressing, the fingerprint direction and a pressure increment or sustained duration related to the fingerprint direction may be obtained by detecting a fingerprint. For example, when the fingerprint direction points to the upper edge of the touchscreen, the adjustment type may be determined as increase, and when the fingerprint direction points to the lower edge of the touchscreen, the adjustment type may be determined as decrease.

C2: An adjustment amount is determined according to the pressure increment or sustained duration related to the fingerprint direction and a step corresponding to the second adjustment precision.

Similar to A2, for example, when a type of adjustment precision is used, each time a pressure sensor senses that the pressure increases by a unit value when the fingerprint direction points to the upper edge of the touchscreen, or each time sustained duration in which the fingerprint direction points to the upper edge of the touchscreen increases by unit duration, the device adjusts the adjustable parameter by 1, that is, a step is 1. When another type of adjustment precision is used, each time a pressure sensor senses that the pressure increases by a unit value, or each time sustained duration in which the fingerprint direction points to the upper edge of the touchscreen increases by unit duration, the adjustable parameter is adjusted by 0.5, that is, a step is 0.5. Therefore, in this embodiment, the adjustment amount is determined according to the deviation angle variation of the fingerprint direction and the step corresponding to the second adjustment precision.

In addition, different unit values or different types of unit duration are probably recognized using different types of adjustment precision, and therefore, different pressure increments or different types of sustained duration that are related to the fingerprint direction are determined. The pressing duration is used an example. When low adjustment precision is used, recognized unit duration is 1, and a corresponding adjustment step is 1. In this case, if the user performs pressing for duration of 0.5, and expects to increase the adjustable parameter by 0.5, because the device cannot precisely recognize 0.5, even though the pressing duration actually lasts for 0.5, the pressing duration determined by the device is 0 or 1 (that is, a processing result of 0.5 is 0 or 1). Correspondingly, the adjustable parameter is not increased (a processing result of 0.5 is 0) or the adjustable parameter is directly increased by 1 (a processing result of 0.5 is 1). Therefore, an adjustment expected by the user for the adjustable parameter cannot be implemented. However, if the user triggers, by inputting trigger information, relatively high adjustment precision, that is, the second adjustment precision, unit duration that can be recognized by the device using the second adjustment precision is 0.1, and a corresponding step is 0.1. When the pressing duration of the user actually increases by 0.5, the device correspondingly increases the adjustable parameter by 0.5.

C3: The first value is adjusted to the second value with reference to the adjustment type and the adjustment amount.

It should be noted that the change information corresponding to the fingerprint is merely an example, and in actual application, change information is not limited to the various types of change information corresponding to the fingerprint. In addition, the touch operation that generates the change information corresponding to the fingerprint is not limited to sliding, rotation, jiggling, pressing or the like mentioned above. That is, in actual application, the touch operation for adjusting the adjustable parameter may be flexibly set, and when the user performs the touch operation for adjusting the adjustable parameter, a fingerprint is detected to obtain change information corresponding to the fingerprint.

In addition, it should be noted that the designated touch operation may differ from the first touch operation and the second touch operation. For example, the first touch operation may be a sliding operation performed for the first time, the second touch operation may be a sliding operation performed for the second time, and between the first sliding operation and the second sliding operation, the designated touch operation performed by the user may be tapping, pressing, or the like. Alternatively, the first touch operation, the second touch operation, and the designated touch operation may be a continuous touch operation. For example, the user finger completes a sliding operation, but a sliding speed of the user finger gradually decreases from the beginning of the sliding to the end of the sliding. Therefore, a sliding process in which a sliding speed is higher than a preset speed may be considered as the first touch operation, a sliding process in which a sliding speed is lower than the preset speed is considered as the second touch operation, and a sliding operation at the preset speed is used as trigger information. Therefore, the sliding operation at the preset speed is used as the designated touch operation, and the sliding operation at the preset speed, the first touch operation, and the second touch operation are consistent and all sliding operations.

In this embodiment, when an adjustable parameter of a device is adjusted, a value of the adjustable parameter is first adjusted to a first value according to touch input of a user on a touch sensor, then accurate fingerprint input may be received using a fingerprint sensor, and the value of the adjustable parameter is accurately adjusted from the first value to a second value according to the fingerprint input. That is, the adjustable parameter is adjusted to a value expected by the user in order to facilitate use for the user.

Figure 6:
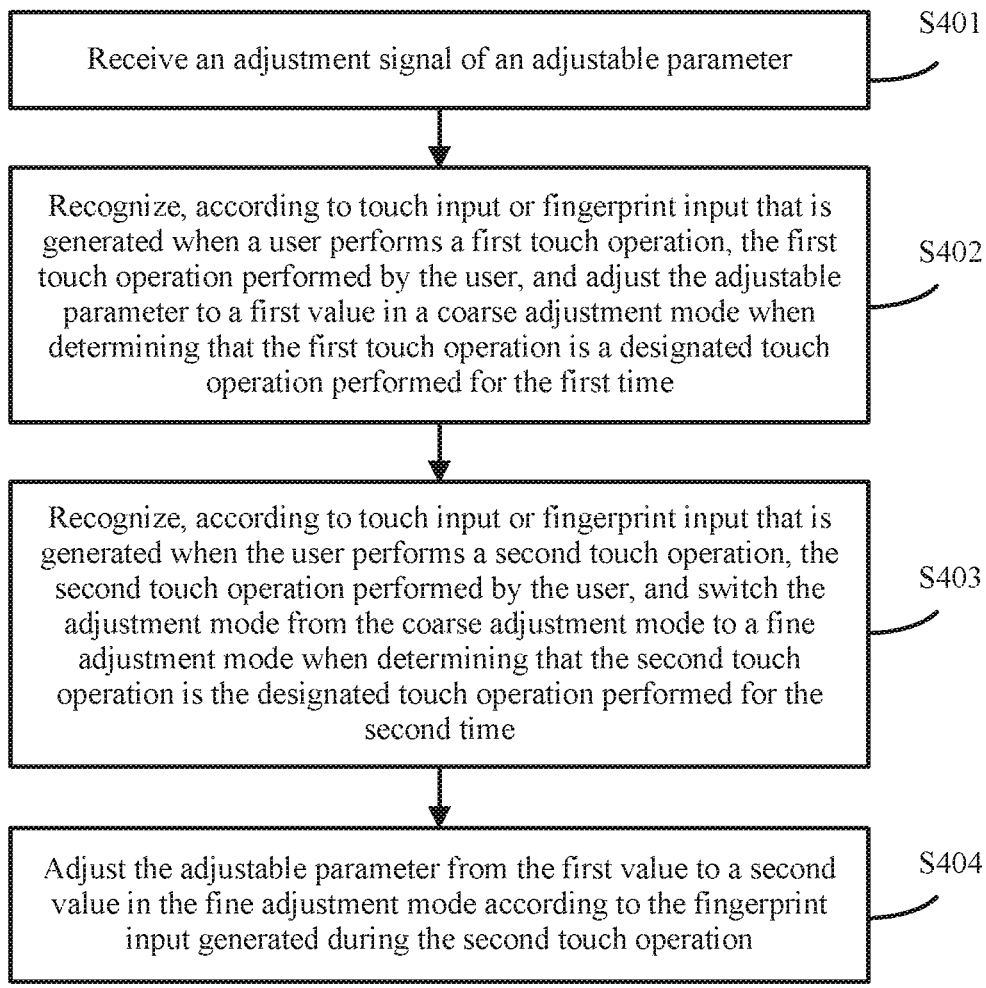
FIG. 6 is a schematic flowchart of Embodiment 4 of an adjustable parameter adjustment method for a device according to the present disclosure.

FIG. 6 is a schematic flowchart of Embodiment 4 of an adjustable parameter adjustment method for a device according to the present disclosure. As shown in FIG. 6, with reference to the foregoing embodiment shown in FIG. 1, FIG. 3, or FIG. 4, this embodiment provides a further description. For example, the device provides two types of adjustment precision, a type of adjustment precision with a relatively small precision value is referred to as a coarse adjustment mode, and a type of adjustment precision with a relatively large precision value is referred to as a fine adjustment mode. Trigger information indicating that a designated touch operation is performed for preset times is also used as an example.

Step S401: Receive an adjustment signal of the adjustable parameter.

For example, if the adjustable parameter is a volume, when the user taps a volume icon, an adjustment signal of the adjustable parameter is sent to the device such that the device learns that the user is to adjust the volume.

Step S402: Recognize, according to touch input or fingerprint input that is generated when the user performs a first touch operation, the first touch operation performed by the user, and adjust the adjustable parameter to the first value in the coarse adjustment mode when determining that the first touch operation is a designated touch operation performed for the first time.

Generally, in this case, after receiving the adjustment signal of the adjustable parameter, the device triggers the coarse adjustment mode by default. That is, in this case, if the user performs an operation for adjusting the adjustable parameter such as pressing a volume button, or the first touch operation is designed as sliding, dragging, or another touch operation for adjusting the adjustable parameter to adjust the volume, the device adjusts the volume according to a variation such as a detected sliding distance and using a step corresponding to the coarse adjustment mode. This embodiment provides a description using a touch operation such as sliding, dragging, jiggling, or rotation as an example.

It may be understood that the device recognizes, according to information generated when the user performs a touch operation, the touch operation performed by the user. In this embodiment, when the user performs the first touch operation, a user finger comes into contact with the touchscreen, and a touch sensor senses the touch of the user finger, that is, in this case, touch input of the user on the touch sensor is received. Alternatively, after step S401, a fingerprint sensor is started, and a user fingerprint is detected when the user performs the first touch operation, that is, fingerprint input of the user on the fingerprint sensor is received. In step S402, that the user performs the first touch operation is recognized according to the touch input or the fingerprint input. Because the first touch operation serving as the designated touch operation performed for the first time cannot be used as the trigger information, the coarse adjustment mode remains unchanged, and the adjustable parameter is adjusted to a first value in the coarse adjustment mode. For example, if a deviation direction of a fingerprint direction and a deviation angle variation of the fingerprint direction are learned of, and a fingerprint moving track does not change, a jiggling operation serving as the first touch operation may be recognized. Because the jiggling operation is also the designated touch operation performed for the first time, and cannot be used as the trigger information, the coarse adjustment mode remains unchanged, and the adjustable parameter is adjusted to the first value according to a deviation amount of the fingerprint direction detected in the jiggling process.

For specific adjustment control for adjusting the adjustable parameter in the coarse adjustment mode described above, that is, adjusting the adjustable parameter using the step corresponding to the coarse adjustment mode and according to the change information corresponding to the fingerprint generated when the user performs the designated touch operation for the first time, refer to the foregoing embodiment shown in FIG. 4.

Step S403: Recognize, according to touch input or fingerprint input that is generated when the user performs a second touch operation, the second touch operation performed by the user, and switch the adjustment mode from the coarse adjustment mode to the fine adjustment mode when determining that the second touch operation is the designated touch operation performed for the second time.

In this embodiment, the designed trigger information is that the designated touch operation is performed for preset times (in this embodiment, the preset times is twice). Therefore, the second touch operation performed by the user is recognized as the designated touch operation performed for the second time, and the adjustment mode is switched from the coarse adjustment mode to the fine adjustment mode. The fingerprint sensor is made in a working state, or the received fingerprint input takes effect after the adjustment mode is switched from the coarse adjustment mode to the fine adjustment mode.

In addition, it should be noted that, if the touch operation for adjusting the adjustable parameter (the first touch operation and the second touch operation) is designed as an action that needs to be performed by the user finger only in a small area, such as jiggling or rotation, considering sensitivity of the fingerprint sensor to changes in a fingerprint direction and displacement, preferably, the fingerprint sensor is started after the adjustment signal of the adjustable parameter is received, and fingerprint input is obtained according to a fingerprint detected by the fingerprint sensor in order to recognize the operation and adjust the adjustable parameter. That is, the touch input is not used in steps S402 and S403.

Further, it should be additionally noted that, when the first touch operation and the second touch operation are designed as operations such as sliding or dragging, a sliding distance or a drag distance may be relatively accurately sensed even using the touch sensor, but the fingerprint sensor always runs such that the user fingerprint may be instantly detected when the adjustment mode is switched to the fine adjustment mode, and the device in a timely manner receives the fingerprint input used in the fine adjustment mode.

Step S404: Adjust the adjustable parameter from the first value to the second value in the fine adjustment mode according to the fingerprint input generated during the second touch operation.

For specific adjustment control, refer to the foregoing embodiment shown in FIG. 4.

In this embodiment, when an adjustable parameter of a device is adjusted, a value of the adjustable parameter is first adjusted to a first value according to touch input of a user on a touch sensor, then accurate fingerprint input may be received using a fingerprint sensor, and the value of the adjustable parameter is accurately adjusted from the first value to a second value according to the fingerprint input. That is, the adjustable parameter is adjusted to a value expected by the user in order to facilitate use for the user.

Figure 7:
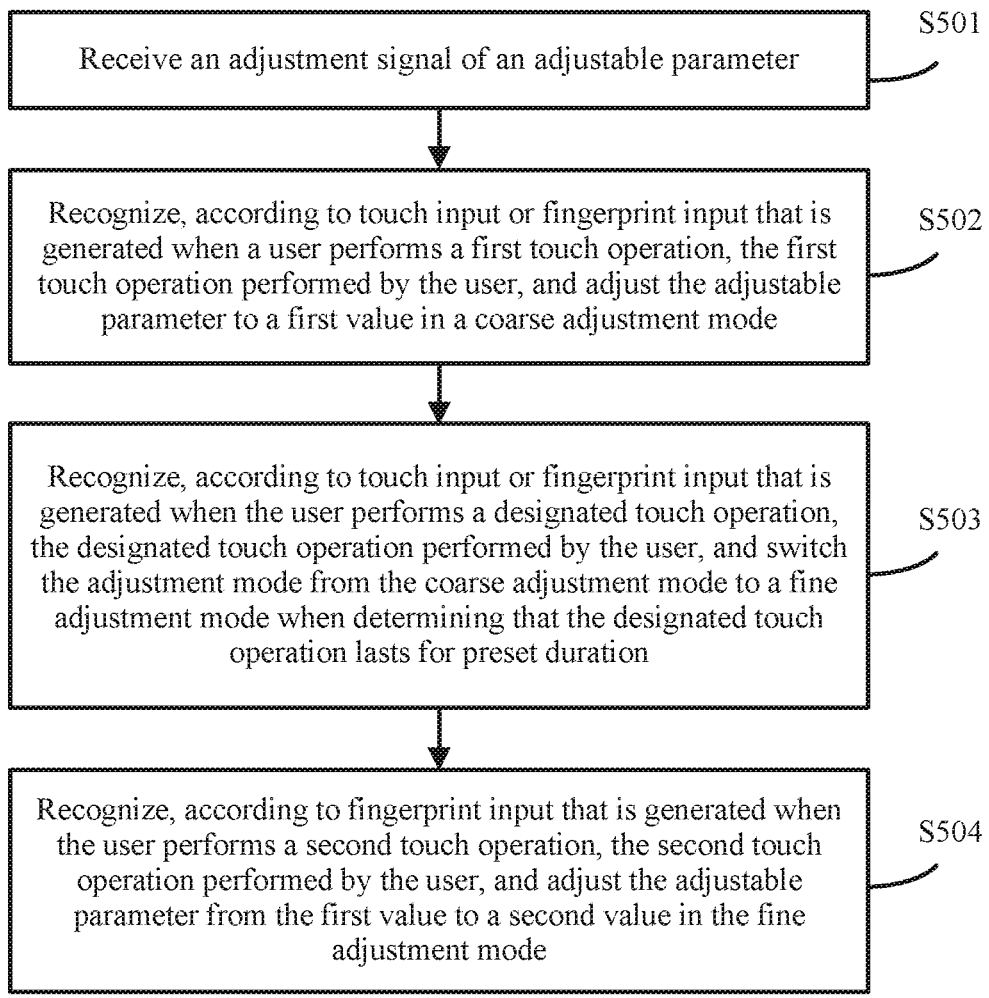
FIG. 7 is a schematic flowchart of Embodiment 5 of an adjustable parameter adjustment method for a device according to the present disclosure.

FIG. 7 is a schematic flowchart of Embodiment 5 of an adjustable parameter adjustment method for a device according to the present disclosure. As shown in FIG. 7, with reference to the foregoing embodiment shown in FIG. 1, FIG. 3, or FIG. 4, this embodiment provides a further description. For example, the device provides two types of adjustment precision, a type of adjustment precision with a relatively small precision value is referred to as a coarse adjustment mode, and a type of adjustment precision with a relatively large precision value is referred to as a fine adjustment mode.

Step S501: Receive an adjustment signal of the adjustable parameter.

For example, if the adjustable parameter is a volume, when the user taps a volume icon, an adjustment signal of the adjustable parameter is sent to the device such that the device learns that the user is to adjust the volume.

Step S502: Recognize, according to touch input or fingerprint input that is generated when the user performs a first touch operation, the first touch operation performed by the user, and adjust the adjustable parameter to the first value in the coarse adjustment mode.

When a touch sensor is in a working state, the first touch operation performed by the user may be recognized according to the touch input, and the adjustable parameter is adjusted to the first value in the coarse adjustment mode. Optionally, a fingerprint sensor is in a working state and constantly detects a user fingerprint, but the device may use or may not use the fingerprint input of the user on the fingerprint sensor in step S502. Alternatively, in this case, if the fingerprint sensor is not in a working state, only the touch input is used in step S502.

Step S503: Recognize, according to touch input or fingerprint input that is generated when the user performs a designated touch operation, the designated touch operation performed by the user, and switch the adjustment mode from the coarse adjustment mode to the fine adjustment mode when determining that the designated touch operation lasts for preset duration.

For example, the designated touch operation is a pressing operation that lasts for the preset duration at a location of the touchscreen. Optionally, the preset duration may be 0, that is, trigger information is that the user performs the designated touch operation.

Further, if the touch sensor senses that a location at which a user finger comes into contact with the touchscreen does not change and the unchanged state lasts for the preset duration, or in step S503, if a fingerprint direction does not deviate and that a moving track does not extend and the length does not increase, it is determined that the user performs a pressing operation. To prevent the fine adjustment mode from being incorrectly triggered because the user unconsciously gently touches a fingerprint recognition region, preferably, it is determined that the user performs the designated touch operation, that is, the pressing operation, only if an area of the fingerprint is greater than a preset value while it is determined that the fingerprint direction does not deviate and that the moving track does not extend and the length does not increase. Further, it is detected that the pressing operation lasts for the preset duration. In this process, the designated touch operation is recognized according to change information corresponding to the fingerprint that is obtained before the trigger information is received. The device can precisely determine the change information corresponding to the fingerprint by detecting the user fingerprint, and the device can also accurately obtain the trigger information in a timely manner in order to facilitate use for the user.

Optionally, the fingerprint sensor is in a working state and constantly detects the user fingerprint, but the device may use or may not use the fingerprint input of the user on the fingerprint sensor in step S502. Alternatively, if the fingerprint sensor is not in the working state, only the touch input is used in step S503. However, after step S503, the device starts the fingerprint recognition sensor to perform step S504. However, to obtain in a timely manner the trigger information that triggers the fine adjustment mode, and improve sensitivity of the device to a random touch operation of the user, the fingerprint sensor may remain in the working state in real time from the start of this embodiment in order to learn in a timely manner that the user performs the designated touch operation, and rapidly switch between the coarse adjustment mode and the fine adjustment mode.

Step S504: Recognize, according to fingerprint input that is generated when the user performs a second touch operation, the second touch operation performed by the user, and adjust the adjustable parameter from the first value to the second value in the fine adjustment mode.

In addition, it should be noted that, in actual application, step S502 may not be performed. That is, when the user needs to adjust the adjustable parameter and expects to use the fine adjustment mode, because the device is set in the coarse adjustment mode by default, step S502 may not be performed. That is, after the user inputs an adjustment signal of the adjustable parameter into the device, the user performs the designated touch operation for the preset duration (the preset duration is equal to or greater than 0), and the device performs step S503 to adjust the adjustment mode to the fine adjustment mode, and then performs step S504. In this case, the first value may be considered as a value of the adjustable parameter before this embodiment is implemented.

In this embodiment, when an adjustable parameter of a device is adjusted, an adjustment mode is switched from a coarse adjustment mode to a fine adjustment mode as long as a user performs a designated touch operation and the designated touch operation lasts for preset duration, and then a value of the adjustable parameter is accurately adjusted, according to fingerprint input of the user on a fingerprint sensor, to a value expected by the user in order to facilitate use for the user.

Figure 8:
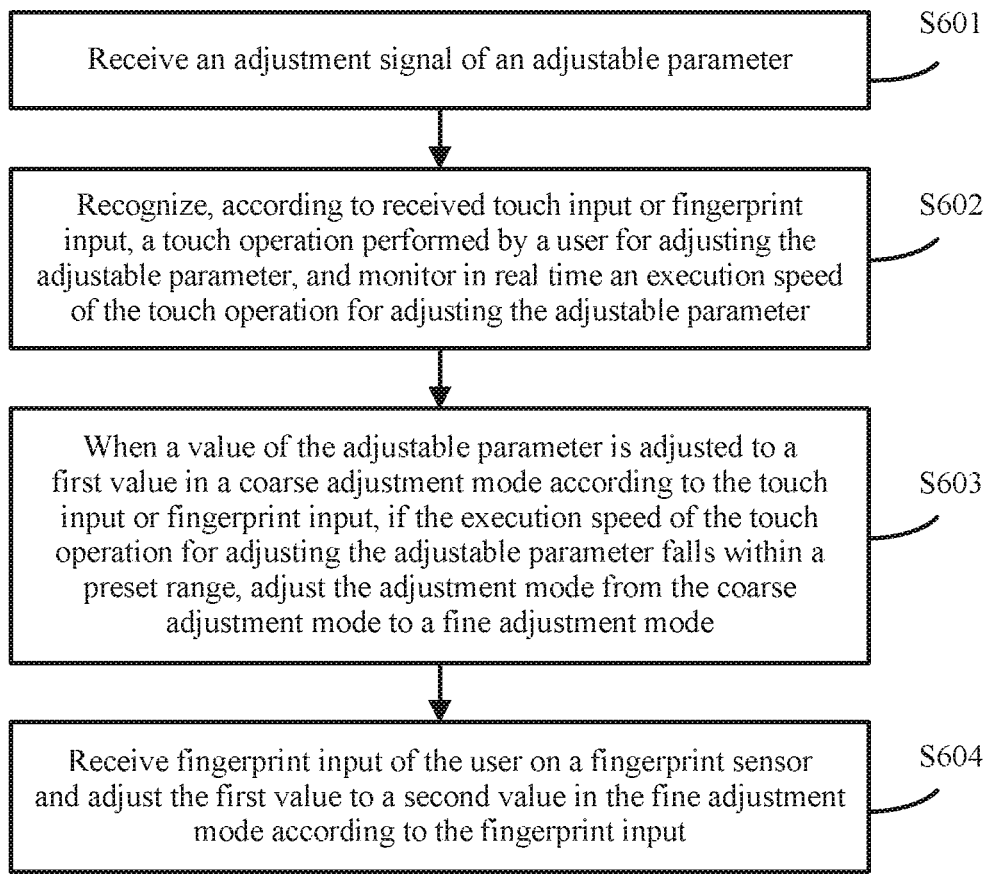
FIG. 8 is a schematic flowchart of Embodiment 6 of an adjustable parameter adjustment method for a device according to the present disclosure.

FIG. 8 is a schematic flowchart of Embodiment 6 of an adjustable parameter adjustment method for a device according to the present disclosure. As shown in FIG. 8, in this embodiment, with reference to the foregoing embodiment shown in FIG. 1 or FIG. 3, trigger information indicating that an execution speed of a designated touch operation falls within a preset range is used as an example to provide a further description.

Step S601: Receive an adjustment signal of the adjustable parameter.

Step S602: Recognize, according to the received touch input or fingerprint input, a touch operation performed by the user for adjusting the adjustable parameter, and monitor in real time an execution speed of the touch operation for adjusting the adjustable parameter.

In this embodiment, a designated touch operation is consistent with the touch operation for adjusting the adjustable parameter. That is, when the user performs the touch operation for adjusting the adjustable parameter, the touch sensor or fingerprint sensor runs and enables the device to receive touch input and/or fingerprint input such that the device recognizes, according to the received touch input or fingerprint input, the touch operation performed by the user for adjusting the adjustable parameter, and monitors in real time the execution speed of the touch operation for adjusting the adjustable parameter. Hence, the device recognizes the designated touch operation and monitors in real time the execution speed of the designated touch operation.

Further, for example, the touch operation for adjusting the adjustable parameter may be sliding, dragging, or the like. In step S602, the touch sensor may be configured to sense a location at which the user finger comes into contact with the touchscreen and recognize, according to a change in the contact location, that the user performs the designated touch operation such as sliding or dragging. The device can further learn of the change in the location at which the user finger comes into contact with the touchscreen and of time for causing the change such that a sliding speed or a dragging speed may be determined. That is, the execution speed of the touch operation for adjusting the adjustable parameter is determined in real time.

Alternatively, in step S601, after receiving the adjustment signal of the adjustable parameter, the device starts the fingerprint recognition sensor. In step S602, that the user performs the touch operation for adjusting the adjustable parameter may be recognized according to the received fingerprint input, and at the same time, the device can further learn of the execution speed of the touch operation for adjusting the adjustable parameter.

Step S603: When a value of the adjustable parameter is adjusted to the first value in a coarse adjustment mode according to the touch input or fingerprint input, if the execution speed of the touch operation for adjusting the adjustable parameter falls within a preset range, adjust the adjustment mode from the coarse adjustment mode to a fine adjustment mode.

Hence, the first value is a value of the adjustable parameter when the execution speed of the touch operation for adjusting the adjustable parameter falls within the preset range.

In this embodiment, when the adjustment signal of the adjustable parameter is received, the coarse adjustment mode is invoked by default, and the received touch input or fingerprint input in step S602 is used to adjust the adjustable parameter in the coarse adjustment mode. In this embodiment, that the execution speed of the designated touch operation falls within the preset range is used as trigger information of the fine adjustment mode, and the designated touch operation is the same as the touch operation for adjusting the adjustable parameter. In step S602 and step S603, if the fingerprint input is used, the designated touch operation in the trigger information is recognized according to the fingerprint input obtained before the trigger information is received. Because a change in the fingerprint may be precisely detected using the fingerprint sensor to detect the user fingerprint, once the execution speed of the designated touch operation falls within the preset range, the device may accurately learn it in a timely manner, that is, receive the trigger information in a timely manner, and rapidly switch to the fine adjustment mode in order to facilitate use for the user.

It should be noted that if the fingerprint recognition sensor is not started when step S602 is performed, the fingerprint recognition sensor is instantly started when step S603 is performed in order to receive the fingerprint input in a timely manner.

Step S604: Receive the fingerprint input of the user on the fingerprint sensor and adjust the first value to the second value in the fine adjustment mode according to the fingerprint input.

It may be understood that, when the value of the adjustable parameter is greatly different from a value expected by the user, the sliding speed or dragging speed of the user is relatively rapid. When the adjustable parameter is close to the value expected by the user, the sliding speed of the user gradually decreases. When the sliding speed of the user gradually decreases to a preset value and increasingly less than the preset value, that is, when the execution speed of the touch operation for adjusting the adjustable parameter falls within the preset range, the coarse adjustment mode is automatically switched to the fine adjustment mode in order to implement a seamless switchover between the coarse adjustment mode and the fine adjustment mode. In addition, the dragging or sliding performed by the user in the coarse adjustment mode may be recognized and used to perform the coarse adjustment mode according to the change in the location at which the user finger comes into contact with the touchscreen. When discovering that the sliding speed of the user gradually decreases to the preset value, the device instantly starts the fingerprint recognition sensor, and then, during the sliding operation of the user, the adjustable parameter is fine adjusted by detecting the user fingerprint and receiving the fingerprint input. Alternatively, during dragging or sliding performed by the user in the coarse adjustment mode, that the user performs the sliding operation or dragging operation serving as the designated touch operation may be recognized by detecting the user fingerprint and according to the fingerprint input, and the coarse adjustment mode is performed according to the fingerprint input. When discovering that the sliding speed of the user gradually decreases to the preset value (usually at this time, the adjustable parameter has been adjusted to the first value), the device continues to receive the fingerprint input in order to fine adjust the adjustable parameter in the fine adjustment mode. That is, before the device obtains the trigger information used to trigger the fine adjustment mode, the sliding operation or dragging operation performed by the user is recognized according to change information corresponding to the fingerprint that is obtained before the trigger information is obtained.

In this embodiment, when an adjustable parameter of a device is adjusted, a value of the adjustable parameter is first adjusted to a first value according to touch input of a user on a touch sensor, then accurate fingerprint input may be received using a fingerprint sensor, and the value of the adjustable parameter is accurately adjusted from the first value to a second value according to the fingerprint input. That is, the adjustable parameter is adjusted to a value expected by the user in order to facilitate use for the user.

Figure 9:
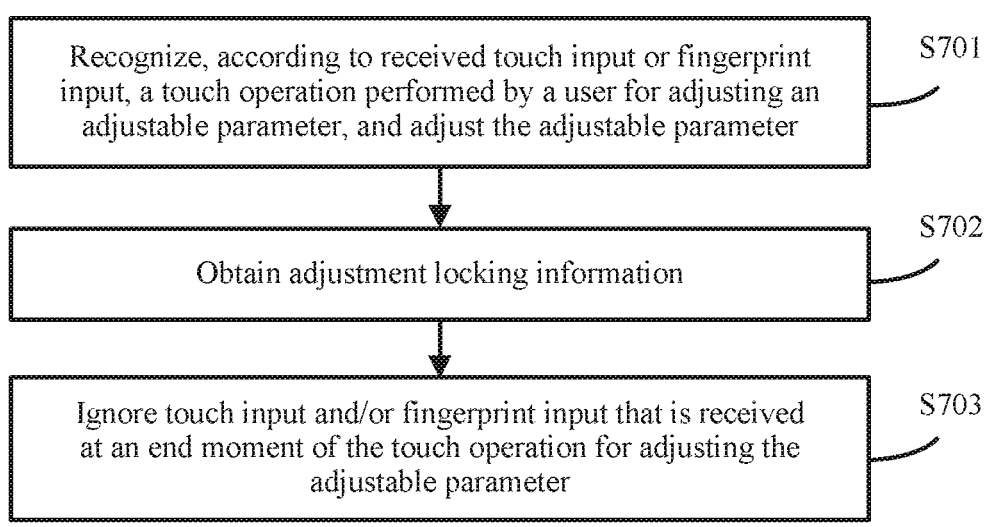
FIG. 9 is a schematic flowchart of Embodiment 7 of an adjustable parameter adjustment method for a device according to the present disclosure.

FIG. 9 is a schematic flowchart of Embodiment 7 of an adjustable parameter adjustment method for a device according to the present disclosure. As shown in FIG. 9, this embodiment includes the following steps.

Step S701: Recognize, according to received touch input or fingerprint input, a touch operation performed by a user for adjusting an adjustable parameter, and adjust the adjustable parameter.

The device can collect, using a touch sensor, a location at which a user finger comes into contact with the touchscreen and recognize, according to a change in the contact location, that the user performs the touch operation for adjusting the adjustable parameter such as sliding or dragging. Alternatively, the device detects the user fingerprint and receives the fingerprint input using a fingerprint sensor in order to recognize the touch operation performed by the user for adjusting the adjustable parameter and adjust the adjustable parameter. In this embodiment, whether to use a coarse adjustment mode or a fine adjustment mode is not limited in step S701.

Step S702: Obtain adjustment locking information.

The adjustment locking information may indicate that the user performs a locking operation, and the locking operation may be performed in the following manner. The user performs a tapping operation or a pressing operation, a finger pressing operation exceeds preset duration, or the like. The sliding operation is used as an example. The user slides the finger on the touchscreen, and when a value of the adjustable parameter reaches a value expected by the user, the user stops sliding and the finger moves away from the touchscreen, that is, the touch operation for adjusting the adjustable parameter is complete. As a result, new touch input or fingerprint input is not generated, and the device does not continue to adjust the adjustable parameter. However, in other approaches, during an extremely short time period after the user stops moving the finger and before the user finger moves away from the touchscreen, an uneven force is applied to the touchscreen. Alternatively, when the user finger shakes, the device considers that the user is continuously performing the touch operation for adjusting the adjustable parameter, and the device continues to adjust the adjustable parameter. For example, after the user adjusts the volume to the expected 56.3, in a process in which the finger ends the touch operation and moves away from the touchscreen, an extremely small change is generated and enables the device to adjust the volume to 56.4 that is different from the value expected by the user, and user experience deteriorates. However, in this embodiment, after adjusting the volume to the expected 56.3, the user enters the adjustment locking information into the device. For example, the user performs the locking operation, and the locking operation may be performed in a manner in which the user performs a tapping operation or a pressing operation, or the like. Optionally, when the user performs the locking operation, the device may detect the user finger using the fingerprint sensor and performs recognition according to the received fingerprint input, or the device may sense, using the touch sensor, that the user performs the locking operation, or the device may determine, using a received locking signal triggered by a physical button, that the user performs the locking operation.

Step S703: Ignore touch input and/or fingerprint input that is received at an end moment of the touch operation for adjusting the adjustable parameter.

It may be understood that, in a time domain, a random moment includes an extremely short time period, and the end moment of the touch operation for adjusting the adjustable parameter also includes the extremely short time period after the user finger stops and before the user finger moves away from the touchscreen. In this extremely short time period, an uneven force is applied to the touchscreen, or the user finger shakes, the fingerprint sensor can still detect an extremely small deviation of the fingerprint direction, or the touch sensor detects an extremely small change in a location at which the user finger comes into contact with the touchscreen. Therefore, the device obtains change information generated in this extremely short time period. However, in this embodiment, because the device has obtained the adjustment locking information in step S702, if the device receives new information when the user finger moves away from the touchscreen, that is, at the end moment of the touch operation for adjusting the adjustable parameter, the device invalidates the new information, and may not use the information or may abandon the information.

For example, after the user adjusts the volume to the expected 56.3 using the sliding operation, the finger that performs the sliding operation does not move, the user finger then moves away, and another finger taps a random location of the touchscreen such that the device locks 56.3. In a period in which the user finger moves away from the touchscreen, even if the user finger moves an extremely small distance, the device abandons change information generated during the extremely small movement and does not use the information to adjust the adjustable parameter. As a result, when the user adjusts the adjustable parameter, an adjustment result is accurately implemented according to a user requirement, and user experience is improved.

In this embodiment, after obtaining adjustment locking information, a device ignores touch input and/or fingerprint input that is received at an end moment of a touch operation for adjusting an adjustable parameter such that the device does not continue to adjust the adjustable parameter when a shape of a touchscreen unevenly changes because a user finger moves away from the touchscreen or when the device considers that the user finger is continuously moving because the user finger shakes, the adjustable parameter is accurately adjusted, and user experience is improved.

Figure 10:
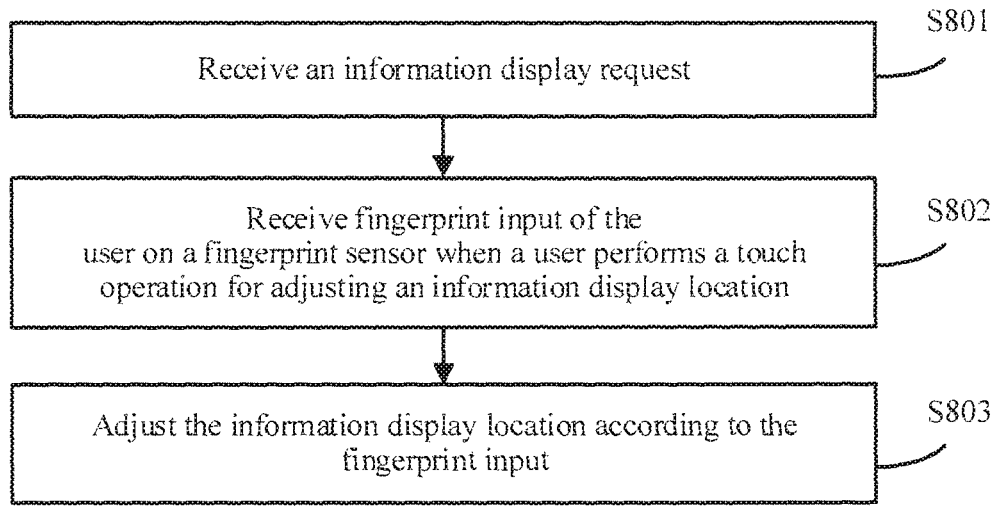
FIG. 10 is a schematic flowchart of Embodiment 8 of an adjustable parameter adjustment method for a device according to the present disclosure.

FIG. 10 is a schematic flowchart of Embodiment 8 of an adjustable parameter adjustment method for a device according to the present disclosure. As shown in FIG. 10, in this embodiment, with reference to the foregoing embodiments, the adjustable parameter in this embodiment may be an information display location, and this embodiment includes the following steps.

Step S801: Receive an information display request.

Information may be a historical browsing record. A display region of the device usually may display multiple historical browsing records. For example, when a user checks the historical browsing records, there are 10 historical browsing records in total, but a total of 5 historical browsing records are listed in the display region from top to bottom. Therefore, the user needs to perform a touch operation for adjusting the information display location in order to change information display locations. For example, information on the top is moved to the lower part of the touchscreen such that information that is not displayed is displayed in a top-bottom sequence. Alternatively, the information may be an icon of a task started by device.

Step S802: Receive fingerprint input of the user on a fingerprint sensor when the user performs a touch operation for adjusting the information display location.

Step S803: Adjust the information display location according to the fingerprint input.

For specific implementation details of steps S802 and S803, refer to A1 to A3, B1 to B3, or C1 to C3.

Optionally, when checking the information, the user may process the information, for example, deleting or disabling a background task. That is, when the user checks the information, the finger performs, in a fingerprint recognition region, the touch operation that is set by the device for processing the information, such as tapping or pressing. Because the user fingerprint is detected in this embodiment, change information corresponding to a fingerprint generated during the touch operation for processing the information may be accurately obtained, and the device can rapidly process the information in a timely manner according to a user requirement.

It should be additionally noted that, optionally, in the foregoing embodiments, the touchscreen does not include a fingerprint sensor, and the fingerprint sensor is connected to some preset physical buttons. A region in which the physical button fits the user fingerprint can accommodate a main feature of the fingerprint, for example, a "home" button of an iPhone. When the user performs a touch operation on the preset physical button, the fingerprint sensor can detect the fingerprint and enable the device to receive fingerprint input of the user on the fingerprint sensor.

In this embodiment, when an information display location is controlled, the information display location is accurately controlled according to fingerprint input of a user. Because the device can accurately learn, according to the fingerprint input of the user, of an extremely small change in a touch location of a user finger on a touchscreen, information can be controlled according to a user requirement and displayed at a location expected by the user in order to facilitate check and control for the user.

Figure 11:
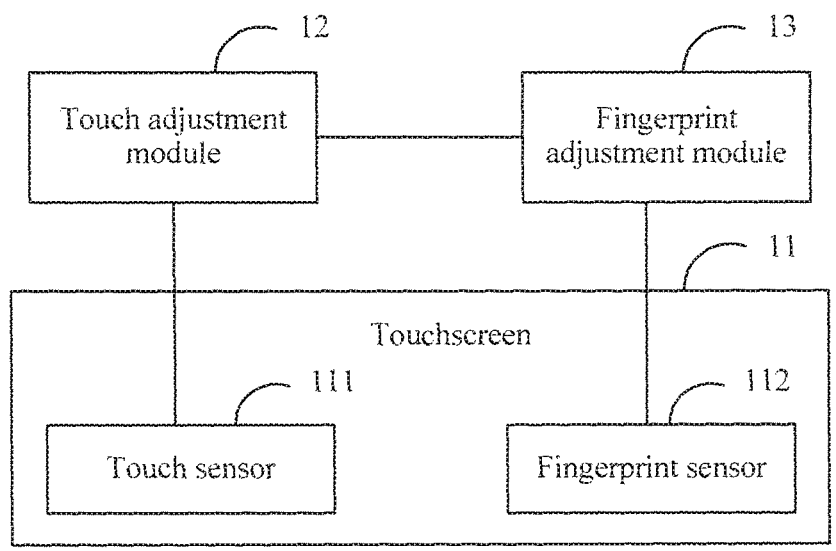
FIG. 11 is a schematic structural diagram of Embodiment 1 of a device according to the present disclosure.

FIG. 11 is a schematic structural diagram of Embodiment 1 of a device according to the present disclosure. As shown in FIG. 11, the device provided in this embodiment includes a touchscreen 11. The touchscreen 11 includes a touch sensor 111 configured to receive touch input of a user and a fingerprint sensor 112 configured to receive fingerprint input of the user, a touch adjustment module 12 configured to receive the touch input of the user on the touch sensor 111 and adjust a value of an adjustable parameter to a first value according to the touch input, and a fingerprint adjustment module 13 configured to receive the fingerprint input of the user on the fingerprint sensor 112 and adjust the first value to a second value according to the fingerprint input.

In this embodiment, when an adjustable parameter of a device is adjusted, the touch adjustment module 12 first adjusts a value of the adjustable parameter to a first value according to touch input of a user on the touch sensor 111, and the fingerprint adjustment module 13 then receives accurate fingerprint input using the fingerprint sensor 112, and accurately adjusts the value of the adjustable parameter from the first value to a second value according to the fingerprint input. That is, the adjustable parameter is adjusted to a value expected by the user in order to facilitate use for the user.

Figure 12:
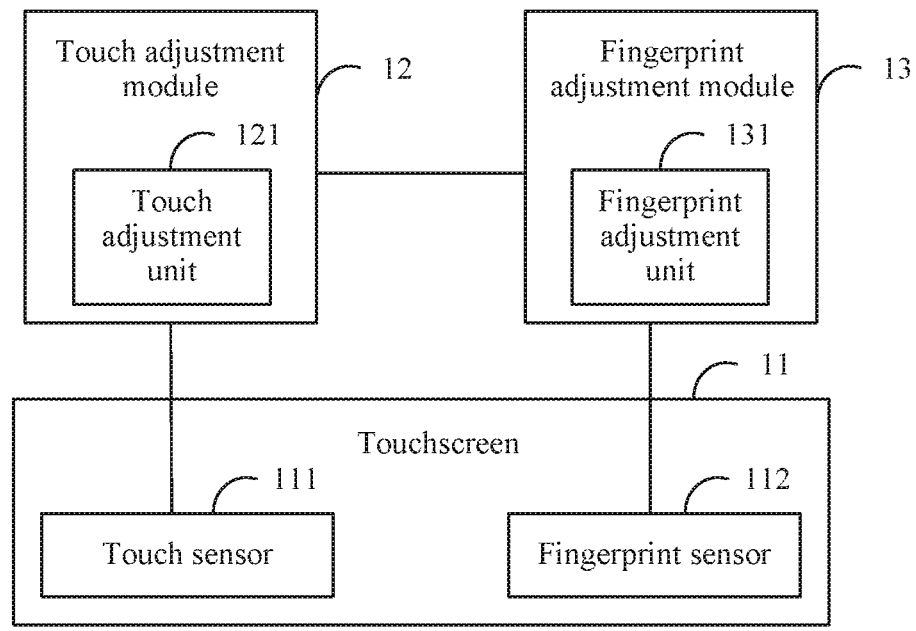
FIG. 12 is a schematic structural diagram of Embodiment 2 of a device according to the present disclosure.

FIG. 12 is a schematic structural diagram of Embodiment 2 of a device according to the present disclosure. As shown in FIG. 12, this embodiment provides a further description based on FIG. 11. Further, the device provides at least two types of adjustment precision with different precision values. The touch adjustment module 12 includes a touch adjustment unit 121 configured to adjust the adjustable parameter from an initial value to the first value using first adjustment precision in the at least two types of adjustment precision with different precision values.

The fingerprint adjustment module 13 includes a fingerprint adjustment unit 131 configured to adjust the first value to the second value using second adjustment precision in the at least two types of adjustment precision with different precision values.

The fingerprint input includes at least one or a combination of the following groups of information an extension direction of a fingerprint moving track and a length variation of the fingerprint moving track, a deviation direction of a fingerprint direction and a deviation angle variation of the fingerprint direction, or a pressure increment or sustained duration related to a fingerprint direction.

Further, the fingerprint adjustment unit 131 is further configured to determine an adjustment type according to the extension direction of the moving track, where the adjustment type includes increase or decrease, determine an adjustment amount according to the length variation of the moving track and a step corresponding to the second adjustment precision, and adjust the first value to the second value with reference to the adjustment type and the adjustment amount.

Alternatively, the fingerprint adjustment unit 131 is further configured to determine an adjustment type according to the deviation direction of the fingerprint direction, where the adjustment type includes increase or decrease, determine an adjustment amount according to the deviation angle variation of the fingerprint direction and a step corresponding to the second adjustment precision, and adjust the first value to the second value with reference to the adjustment type and the adjustment amount.

Alternatively, the fingerprint adjustment unit 131 is further configured to determine an adjustment type according to the fingerprint direction, where the adjustment type includes increase or decrease, determine an adjustment amount according to the pressure increment or sustained duration related to the fingerprint direction, and a step corresponding to the second adjustment precision, and adjust the first value to the second value with reference to the adjustment type and the adjustment amount.

The fingerprint adjustment module 13 is further configured to receive trigger information used to trigger the device to perform adjusting the first value to a second value according to the fingerprint input.

The trigger information includes at least one piece of the following information a designated signal triggered by a physical button of the device, information indicating that the user performs a designated touch operation, information indicating that a designated touch operation is performed for preset times, information indicating that a designated touch operation lasts for preset duration, or information indicating that an execution speed of a designated touch operation falls within a preset range.

In addition, the fingerprint adjustment module 13 is further configured to recognize the designated touch operation according to the fingerprint input obtained before the trigger information is received.

The designated touch operation includes at least one or a combination of the operations of tapping, pressing, sliding, rotation, or jiggling.

In this embodiment, a device provides multiple types of adjustment precision. When an adjustable parameter is adjusted, after touch input is obtained using the touch sensor 111, the device rapidly adjusts the adjustable parameter to a first value using first adjustment precision, then obtains accurate fingerprint input using the fingerprint sensor 112, and accurately adjusts the adjustable parameter from the first value to a second value using second adjustment precision. Because a fingerprint includes multiple features such as nodes and fingerprint directions, an extremely small movement of a user finger can be detected in order to avoid that the device does not accurately locate the user finger or cannot obtain an extremely small change in location of the user finger. Therefore, the device can adjust, using the fingerprint input and the second adjustment precision and according to a user requirement, the adjustable parameter to a value expected by a user in order to facilitate use for the user.

It should be noted that, the modules in the foregoing devices shown in FIG. 11 and FIG. 12 correspondingly perform the steps in the foregoing method embodiments. For a specific implementation process and a technical effect, refer to the foregoing method embodiments.

Figure 13:
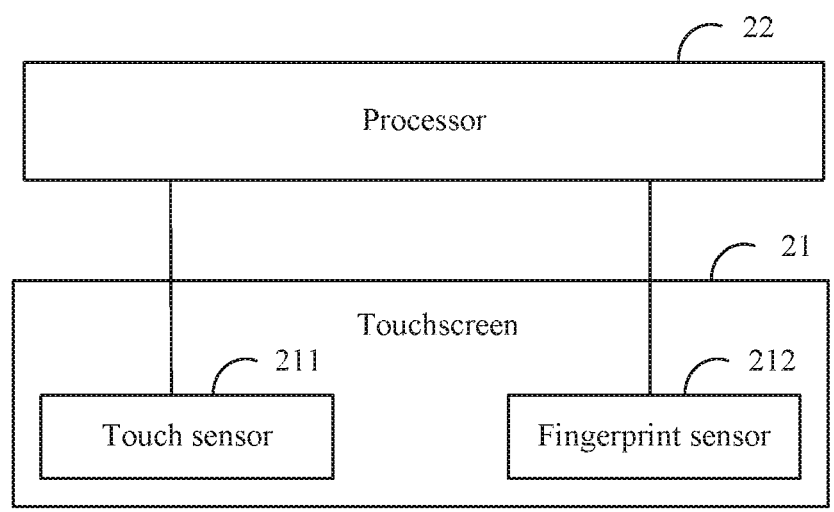
FIG. 13 is a schematic structural diagram of Embodiment 3 of a device according to the present disclosure.

FIG. 13 is a schematic structural diagram of Embodiment 3 of a device according to the present disclosure. As shown in FIG. 13, the device includes a touchscreen 21. The touchscreen 21 includes a touch sensor 211 configured to receive touch input of a user and a fingerprint sensor 212 configured to receive fingerprint input of the user.

A processor 22 is configured to receive the touch input of the user on the touch sensor 211 and adjust a value of an adjustable parameter to a first value according to the touch input, and receive the fingerprint input of the user on the fingerprint sensor 212 and adjust the first value to a second value according to the fingerprint input.

Further, the device provides at least two types of adjustment precision with different precision values. When adjusting the value of the adjustable parameter to the first value according to the touch input, the processor 22 is further configured to adjust an initial value of the adjustable parameter to the first value using first adjustment precision in the at least two types of adjustment precision with different precision values.

When adjusting the first value to the second value according to the fingerprint input, the processor 22 is further configured to adjust the first value to the second value using second adjustment precision in the at least two types of adjustment precision with different precision values.

Optionally, the fingerprint input includes at least one or a combination of the following groups of information an extension direction of a fingerprint moving track and a length variation of the fingerprint moving track, a deviation direction of a fingerprint direction and a deviation angle variation of the fingerprint direction, or a pressure increment or sustained duration related to a fingerprint direction.

Optionally, when adjusting the first value to the second value using the second adjustment precision in the at least two types of adjustment precision with different precision values, the processor 22 is further configured to determine an adjustment type according to the extension direction of the moving track, where the adjustment type includes increase or decrease, determine an adjustment amount according to the length variation of the moving track and a step corresponding to the second adjustment precision, and adjust the first value to the second value with reference to the adjustment type and the adjustment amount.

Optionally, when adjusting the first value to the second value using the second adjustment precision in the at least two types of adjustment precision with different precision values, the processor 22 is further configured to determine an adjustment type according to the deviation direction of the fingerprint direction, where the adjustment type includes increase or decrease, determine an adjustment amount according to the deviation angle variation of the fingerprint direction and a step corresponding to the second adjustment precision, and adjust the first value to the second value with reference to the adjustment type and the adjustment amount.

Optionally, when adjusting the first value to the second value using the second adjustment precision in the at least two types of adjustment precision with different precision values, the processor 22 is further configured to determine an adjustment type according to the fingerprint direction, where the adjustment type includes increase or decrease, determine an adjustment amount according to the pressure increment or sustained duration related to the fingerprint direction, and a step corresponding to the second adjustment precision, and adjust the first value to the second value with reference to the adjustment type and the adjustment amount.

Optionally, the processor 22 is further configured to receive trigger information used to trigger the device to perform adjusting the first value to a second value according to the fingerprint input.

The trigger information includes at least one piece of the following information a designated signal triggered by a physical button of the device, information indicating that the user performs a designated touch operation, information indicating that a designated touch operation is performed for preset times, information indicating that a designated touch operation lasts for preset duration, or information indicating that an execution speed of a designated touch operation falls within a preset range.

Optionally, the processor 22 is further configured to recognize the designated touch operation according to the fingerprint input obtained before the trigger information is received.

The designated touch operation includes at least one or a combination of the operations of tapping, pressing, sliding, rotation, or jiggling.

In this embodiment, when an adjustable parameter of a device is adjusted, the processor 22 first adjusts a value of the adjustable parameter to a first value according to touch input of a user on the touch sensor 211, then receives accurate fingerprint input using the fingerprint sensor 212, and accurately adjusts the value of the adjustable parameter from the first value to a second value according to the fingerprint input. Optionally, the adjustable parameter is adjusted to a value expected by the user in order to facilitate use for the user. Optionally, in this embodiment, the device provides multiple types of adjustment precision. When the adjustable parameter is adjusted, after the touch input is obtained using the touch sensor 211, the device rapidly adjusts the adjustable parameter to the first value using first adjustment precision, then obtains the accurate fingerprint input using the fingerprint sensor 212, and accurately adjusts the adjustable parameter from the first value to the second value using second adjustment precision. Because a fingerprint includes multiple features such as nodes and fingerprint directions, an extremely small movement of a user finger can be detected in order to avoid that the device does not accurately locate the user finger or cannot obtain an extremely small change in location of the user finger. Therefore, the device can adjust, using the fingerprint input and the second adjustment precision and according to a user requirement, the adjustable parameter to the value expected by the user in order to facilitate use for the user.

It should be noted that, the processor 22 in the device embodiment shown in FIG. 13 correspondingly performs the steps in the foregoing method embodiments. For specific implementation details and a beneficial effect, refer to the foregoing method embodiments.

Figure 14:
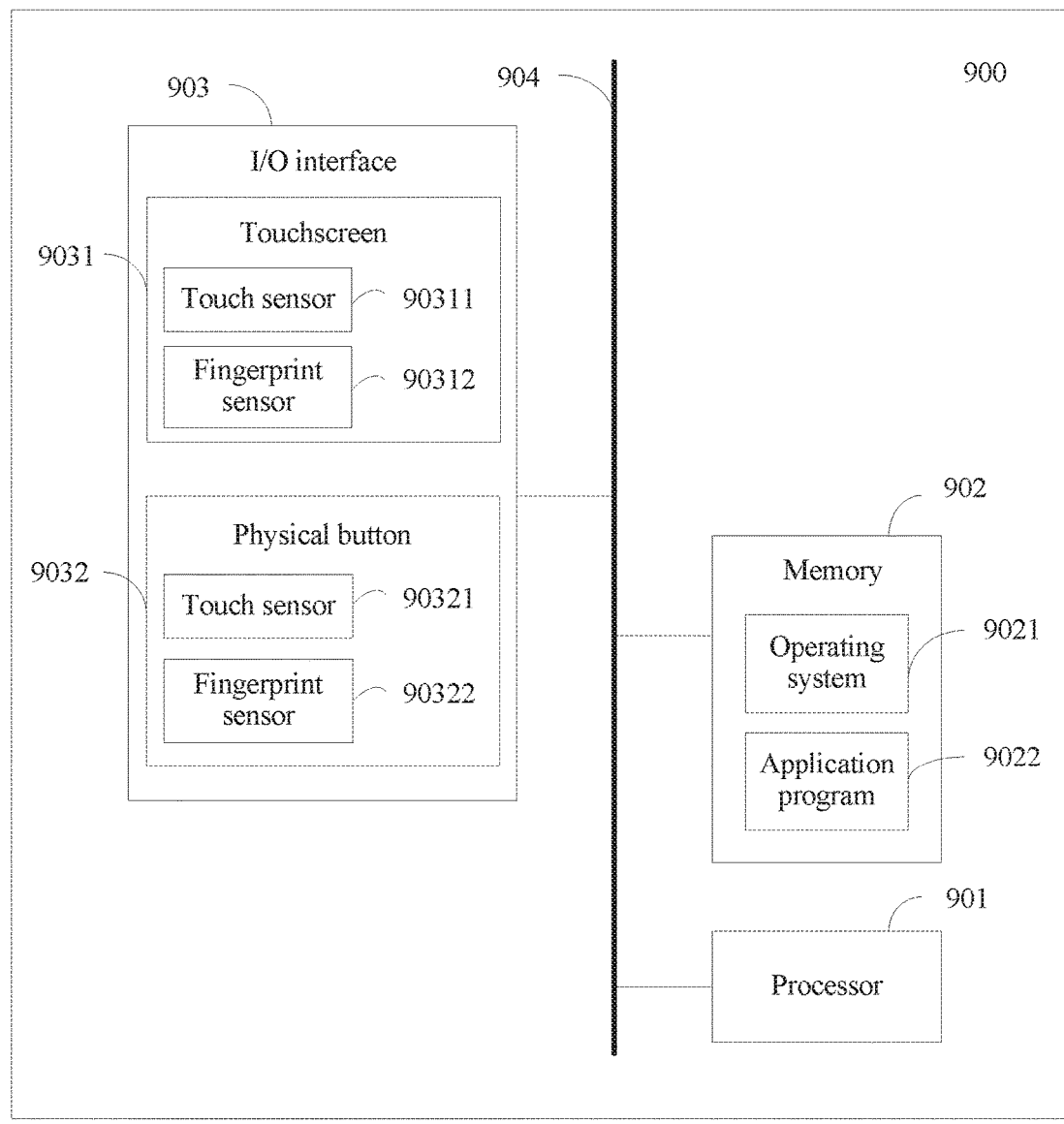
FIG. 14 is a schematic structural diagram of Embodiment 4 of a device according to the present disclosure.

FIG. 14 is a schematic structural diagram of Embodiment 4 of a device 900 according to the present disclosure. As shown in FIG. 14, it should be understood that, the device 900 shown in FIG. 14 is merely an example, and the device 900 may have components that are more than or less than components shown in FIG. 14, may combine two or more components, or may have different component configurations. The various components shown in FIG. 14 may be implemented in hardware that includes one or more signal processing and/or application-specific integrated circuits, in software, or in a combination of hardware and software.

The device 900 is now used as an example for a specific description. As shown in FIG. 14, the device 900 includes at least one processor 901, a memory 902, an input/output (I/O) interface 903, and at least one communications bus 904. The device 900 further includes another functional component such as a battery module (not shown) or a wired/wireless charger interface (not shown). The communications bus 904 is configured to implement connection and communication between the components. The memory 902 may include a non-volatile solid-state memory and/or a dynamic non-volatile storage device, such as a flash memory and a rotatable disk drive.

Further, the I/O interface 903 includes at least a touchscreen 9031 for display and input, and a physical button 9032 (optional) for input. The touchscreen 9031 includes a touch sensor 90311, and optionally, further includes a fingerprint sensor 90312, or the physical button 9032 may include a touch sensor 90321, and optionally, further include a fingerprint sensor 90322. It should be noted that, when the device needs to adjust an adjustable parameter using a fingerprint, either the touchscreen 9031 or the physical button 9032 (for example, a HOME button) needs to include the fingerprint sensor 90312 or 90322.

Further, the memory 902 includes an operating system 9021 and an application program 9022. The operating system 9021 includes various operating system programs used to implement various hardware-based operations. The application program 9022 includes various application programs used to implement various application functions, for example recognizing a touch operation according to touch input/fingerprint input of a user, collecting touch input/fingerprint input, and adjusting the adjustable parameter according to the touch input/fingerprint input when a user performs a touch operation for adjusting an adjustable parameter, recognizing a designated touch operation according to touch input/fingerprint input of a user, and invoking corresponding adjustment precision, recognizing a locking operation according to touch input/fingerprint input of a user, and ignoring touch input or fingerprint input or both that are received at an end moment of a touch operation for adjusting an adjustable parameter, or adjusting a display location of information according to fingerprint input.

Further, the memory 902 may further store descriptions of various operations such as the touch operation for adjusting the adjustable parameter, the designated touch operation, and the locking operation such that the processor 901 compares the touch input/fingerprint input with the descriptions of the various operations to recognize the various operations. In addition, the processor 901 may further store the foregoing preset duration, a preset range that is set for an execution speed of the touch operation for adjusting the adjustable parameter, and the like.

The processor 901 communicates with the modules and the components using the communications bus 904. The touch sensor (90311 or 90321) receives touch input that is input by the user, and then sends the touch input to the processor 901. Therefore, the processor 901 may recognize a touch operation, adjust an adjustable parameter, and the like according to the touch input. The fingerprint sensor (90312 or 90322) receives fingerprint input that is input by the user, and then sends the fingerprint input to the processor 901. Therefore, the processor 901 may recognize a touch operation, adjust an adjustable parameter, and the like according to the fingerprint input.

In this embodiment, when an adjustable parameter of the device 900 is adjusted, the processor 901 first adjusts a value of the adjustable parameter to a first value according to touch input of a user on the touch sensor 90311 or 90321, then receives accurate fingerprint input using the fingerprint sensor 90312 or 90322, and accurately adjusts the value of the adjustable parameter from the first value to a second value according to the fingerprint input. That is, the adjustable parameter is adjusted to a value expected by the user in order to facilitate use for the user. Optionally, in this embodiment, the device 900 provides multiple types of adjustment precision. When the adjustable parameter is adjusted, after the touch input is obtained using the touch sensor 90311 or 90321, the device 900 rapidly adjusts the adjustable parameter to the first value using first adjustment precision, then obtains the accurate fingerprint input using the fingerprint sensor 90312 or 90322, and accurately adjusts the adjustable parameter from the first value to the second value using second adjustment precision. Because a fingerprint includes multiple features such as nodes and fingerprint directions, an extremely small movement of a user finger can be detected in order to avoid that the device 900 does not accurately locate the user finger or cannot obtain an extremely small change in location of the user finger. Therefore, the device 900 can adjust, using the fingerprint input and the second adjustment precision and according to a user requirement, the adjustable parameter to the value expected by the user in order to facilitate use for the user.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An adjustable parameter adjustment method for a device, wherein the device comprises a touchscreen with a touch sensor and a fingerprint sensor, the method comprising:
   providing at least two types of adjustment precision with different precision values, the types of adjustment precision comprising a first type of adjustment precision and a second type of adjustment precision;
   receiving, on the touch sensor, a user touch input of a user finger;
   adjusting, according to the user touch input, an initial value of an adjustable parameter to a first value using the first type of adjustment precision;
   receiving, on the fingerprint sensor without moving the user finger, a user fingerprint input, the user fingerprint input comprising a fingerprint direction and a sustained duration related to the fingerprint direction, the fingerprint direction being ridge lines in a fingerprint image received in the user fingerprint input; and
   adjusting, according to the user fingerprint input, the first value to a second value using the second type of adjustment precision, and adjusting the first value to the second value comprises:
      determining an increase or a decrease in an adjustment type according to the fingerprint direction;
      determining an adjustment amount according to the sustained duration related to the fingerprint direction and an adjustment step corresponding to the second type of adjustment precision; and
      adjusting the first value to the second value with reference to the adjustment type and the adjustment amount.

2. The adjustable parameter adjustment method of claim 1, wherein the user fingerprint input further comprises one or more of:
   an extension direction of a fingerprint moving track and a length variation of the fingerprint moving track;
   a deviation direction of the fingerprint direction and a variation in a deviation angle of the fingerprint direction; or
   a pressure increment related to the fingerprint direction.

3. The adjustable parameter adjustment method of claim 2, wherein adjusting the first value to the second value using the second type of adjustment precision comprises:
   determining the adjustment type according to the extension direction of the fingerprint moving track, the adjustment type comprising the increase or the decrease;
   determining the adjustment amount according to the length variation of the fingerprint moving track and an adjustment step corresponding to the second type of adjustment precision; and
   adjusting the first value to the second value with reference to the adjustment type and the adjustment amount.

4. The adjustable parameter adjustment method of claim 2, wherein adjusting the first value to the second value using the second type of adjustment precision comprises:
   determining the increase or the decrease in the adjustment type according to the deviation direction of the fingerprint direction;
   determining the adjustment amount according to the variation in the deviation angle of the fingerprint direction and the adjustment step corresponding to the second type of adjustment precision; and
   adjusting the first value to the second value with reference to the adjustment type and the adjustment amount.

5. The adjustable parameter adjustment method of claim 1, wherein before adjusting the first value to the second value, the method further comprises receiving trigger information to trigger the fingerprint sensor to receive the user fingerprint input prior to providing the user fingerprint input, and the trigger information comprises at least one of the following:
   a designated signal triggered by a physical button of the device;
   first information indicating that the user finger performs a designated touch operation;
   second information indicating that the designated touch operation is performed for preset times;
   third information indicating that the designated touch operation lasts for a preset duration; or
   fourth information indicating that an execution speed of the designated touch operation is within a preset range.

6. The adjustable parameter adjustment method of claim 5, further comprising recognizing the designated touch operation according to the user fingerprint input obtained before receiving the trigger information.

7. The adjustable parameter adjustment method of claim 5, wherein the designated touch operation comprises one or more of tapping, pressing, sliding, rotation, or jiggling.

8. The adjustable parameter adjustment method of claim 1, wherein determining the increase or the decrease in the adjustment type comprises:
   adjusting the adjustable parameter by pressing the touch sensor;
   determining the adjustment type as the increase in the adjustment type when the fingerprint direction is pointing towards an upper edge of the touchscreen; and
   determining the adjustment type as the decrease in the adjustment type when the fingerprint direction is pointing towards a lower edge of the touchscreen.

9. The adjustable parameter adjustment method of claim 1, wherein the method further comprises:
   using one type of adjustment precision or another type of adjustment precision; and
   determining the adjustment amount according to the sustained duration and the adjustment step corresponding to the second type of adjustment precision comprises:
      adjusting the adjustable parameter according to a first predefined step in the one type of adjustment precision when the sustained duration of the fingerprint direction pointing towards an upper edge of the touchscreen increases by a first unit duration; and
      adjusting the adjustable parameter according to a second predefined step corresponding to the other type of adjustment precision when the sustained duration of the fingerprint direction pointing towards the upper edge of the touchscreen increases by a second unit duration.

10. A device, comprising:
    a touchscreen, comprising:
       a touch sensor configured to receive user touch input of a user finger; and
       a fingerprint sensor configured to receive user fingerprint input without moving the user finger, the user fingerprint input comprising a fingerprint direction and a sustained duration related to the fingerprint direction, the fingerprint direction being ridge lines in a fingerprint image received in the user fingerprint input; and
    a processor coupled to the touch sensor and the fingerprint sensor and configured to:

provide at least two types of adjustment precision with different precision values, the types of adjustment precision comprising a first type of adjustment precision and a second type of adjustment precision;

adjust an initial value of an adjustable parameter to a first value according to the user touch input using the first type of adjustment precision;

adjust the first value to a second value according to the user fingerprint input using the second type of adjustment precision, the processor being configured to adjust the first value to the second value according to:

determine an increase or a decrease in an adjustment type according to the fingerprint direction;

determine an adjustment amount according to the sustained duration related to the fingerprint direction and an adjustment step corresponding to the second type of adjustment precision; and adjust the first value to the second value with reference to the adjustment type and the adjustment amount.

11. The device of claim 10, wherein the user fingerprint input further comprises one or more of:

an extension direction of a fingerprint moving track and a length variation of the fingerprint moving track; and a deviation direction of the fingerprint direction and a variation in a deviation angle of the fingerprint direction; or a pressure increment related to the fingerprint direction.

12. The device of claim 11, wherein when adjusting the first value to the second value with reference to the adjustment type and the adjustment amount, the processor is further configured to:

determine the increase or the decrease in the adjustment type according to the extension direction of the fingerprint moving track; and determine the adjustment amount according to the length variation of the fingerprint moving track and the adjustment step corresponding to the second type of adjustment precision.

13. The device of claim 11, wherein when adjusting the first value to the second value with reference to the adjustment type and the adjustment amount, the processor is further configured to:

determine the increase or the decrease in the adjustment type according to the deviation direction of the fingerprint direction; and determine the adjustment amount according to the variation in the deviation angle of the fingerprint direction and an adjustment step corresponding to the second type of adjustment precision.

14. The device of claim 11, wherein when adjusting the first value to the second value with reference to the adjustment type and the adjustment amount, the processor is further configured to:

determine the increase or the decrease in the adjustment type according to the fingerprint direction; and determine the adjustment amount according to the sustained duration related to the fingerprint direction and the adjustment step corresponding to the second type of adjustment precision.

15. The device of claim 10, wherein the processor is further configured to receive trigger information to trigger the fingerprint sensor to receive the user fingerprint input prior to providing the user fingerprint input, and the trigger information comprises at least one of the following:

a designated signal triggered by a physical button of the device;

first information indicating that a user touch operation is a designated touch operation;

second information indicating that the designated touch operation is performed for a preset time;

third information indicating that the designated touch operation is for a preset duration; or fourth information indicating that an execution speed of the designated touch operation is within a preset range.

16. The device of claim 15, wherein the processor is further configured to recognize the designated touch operation according to the user fingerprint input obtained before receiving the trigger information.

17. The device of claim 15, wherein the designated touch operation comprises one or more of tapping, pressing, sliding, rotating, or jiggling.

18. The device of claim 10, wherein the processor is further configured to determine the increase or the decrease in the adjustment type according to:

adjust the adjustable parameter by pressing the touch sensor;

determine the adjustment type as the increase in the adjustment type when the fingerprint direction is pointing towards an upper edge of the touchscreen; and determine the adjustment type as the decrease in the adjustment type when the fingerprint direction is pointing towards a lower edge of the touchscreen.

19. The device of claim 10, wherein the processor is further configured to:

use one type of adjustment precision or another type of adjustment precision; and determine the adjustment amount and the adjustment step corresponding to the second type of adjustment precision according to:

adjust the adjustable parameter according to a first predefined step in the one type of adjustment precision when the sustained duration of the fingerprint direction pointing towards an upper edge of the touchscreen increases by a first unit duration; and adjust the adjustable parameter according to a second predefined step corresponding to the other type of adjustment precision when the sustained duration of the fingerprint direction pointing towards the upper edge of the touchscreen increases by a second unit duration.

20. The device of claim 19, wherein the processor is further configured to determine the adjustment amount and the adjustment step corresponding to the second type of adjustment precision according to:

adjust the adjustable parameter according to the first predefined step in the one type of adjustment precision when the fingerprint direction of a pressure increment pointing towards an upper edge of the touchscreen increases by a first unit duration; and adjust the adjustable parameter according to a second predefined step corresponding to the other type of adjustment precision when the fingerprint direction of the pressure increment pointing towards the upper edge of the touchscreen increases by a second unit duration.

* * * * *